Sept. 19, 1933.  A. G. PIECZENTKOWSKI  1,927,708
PROCESS OF AND APPARATUS FOR WINDING AND WRAPPING STRAND-LIKE ARTICLES
Filed Feb. 13, 1931  23 Sheets-Sheet 1
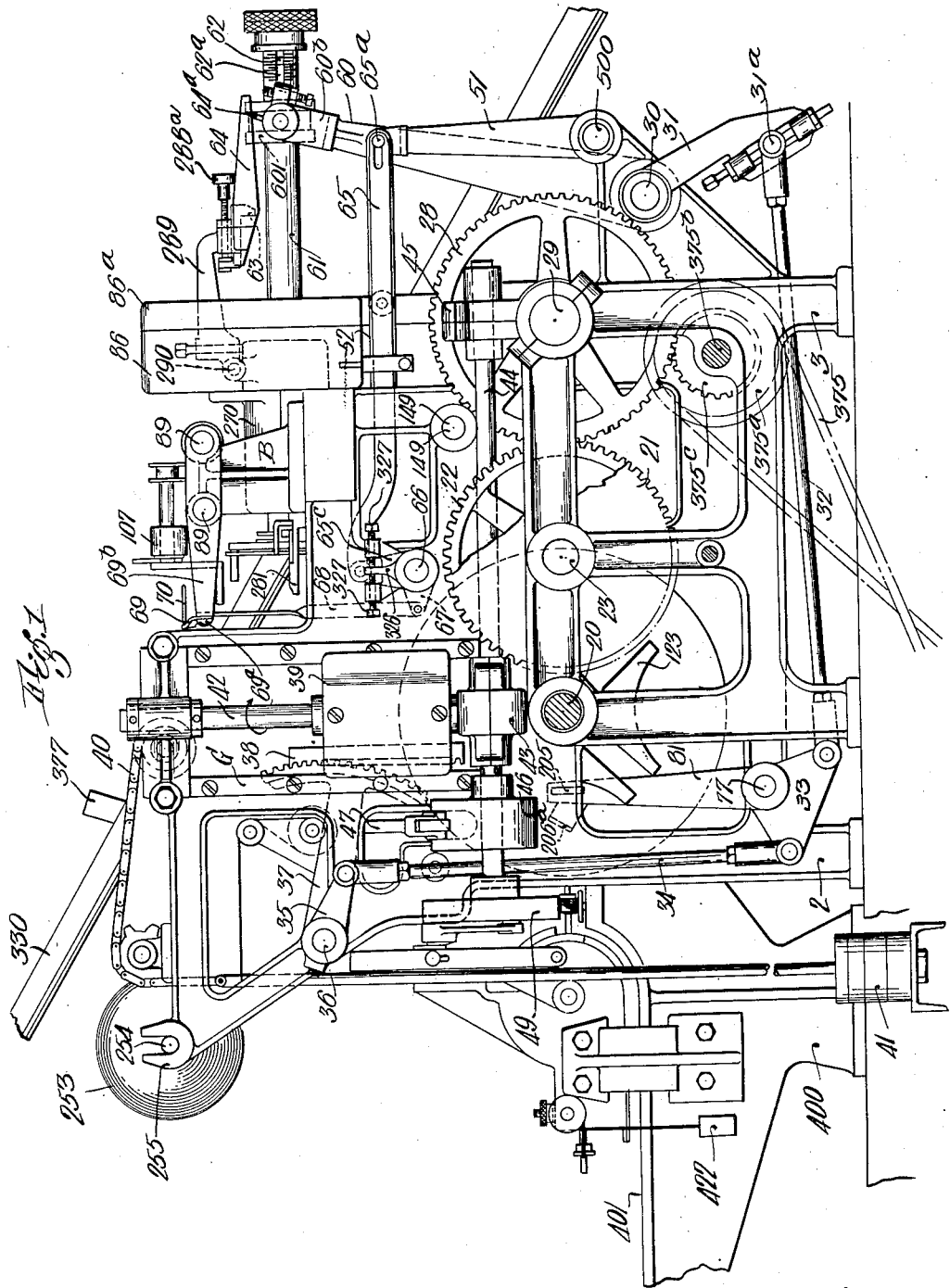

Sept. 19, 1933. A. G. PIECZENTKOWSKI 1,927,708
PROCESS OF AND APPARATUS FOR WINDING AND WRAPPING STRAND-LIKE ARTICLES
Filed Feb. 13, 1931 23 Sheets-Sheet 2
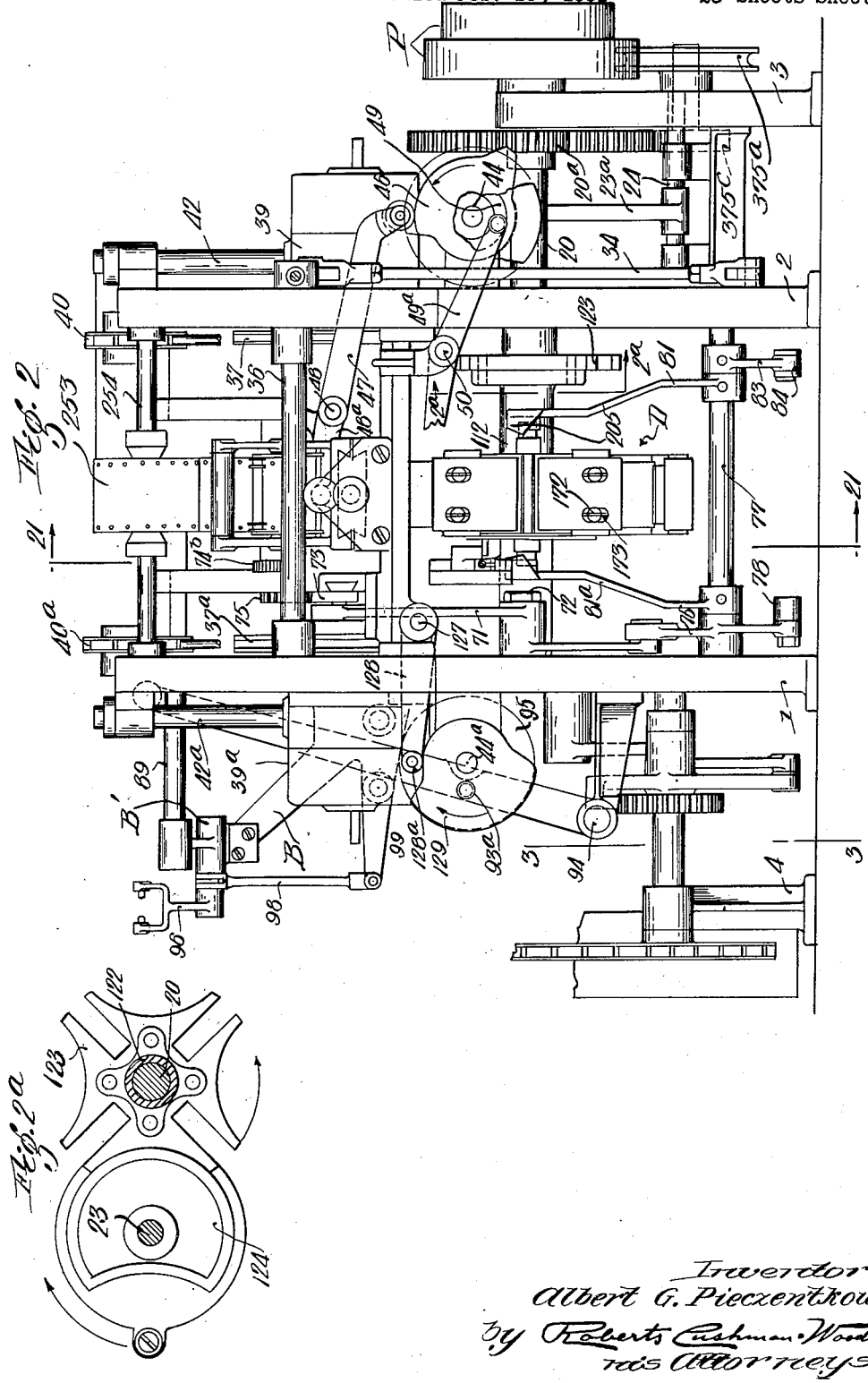

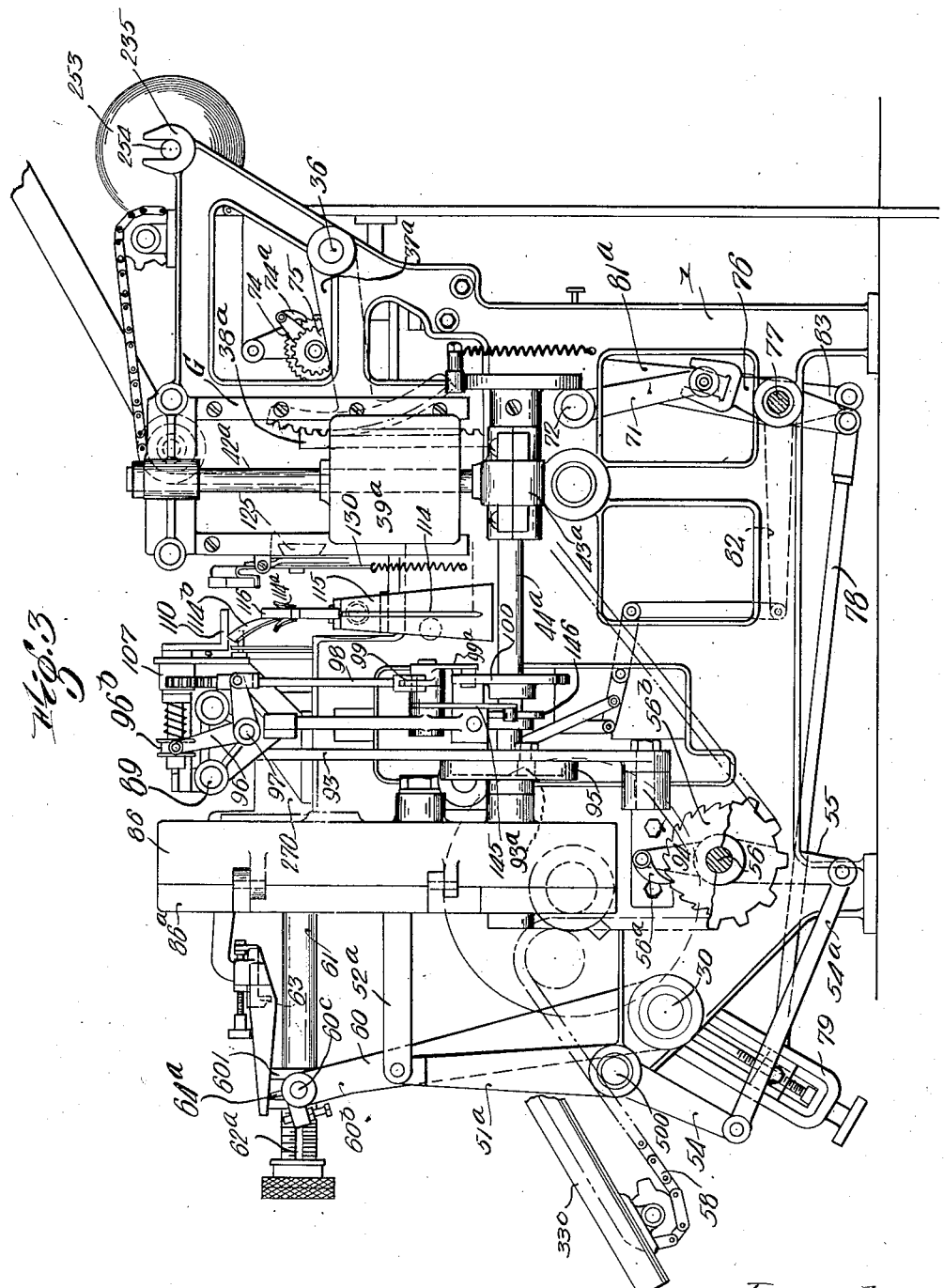

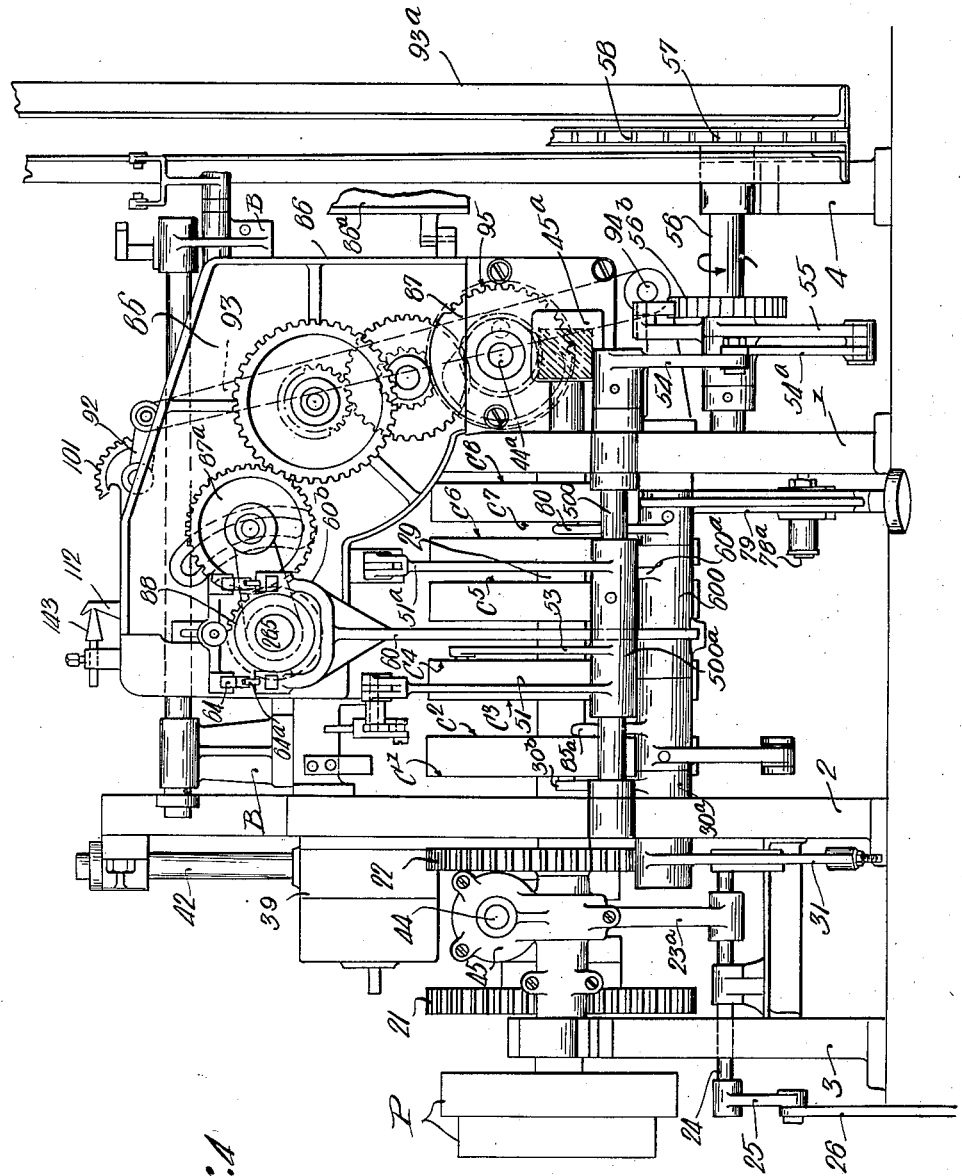

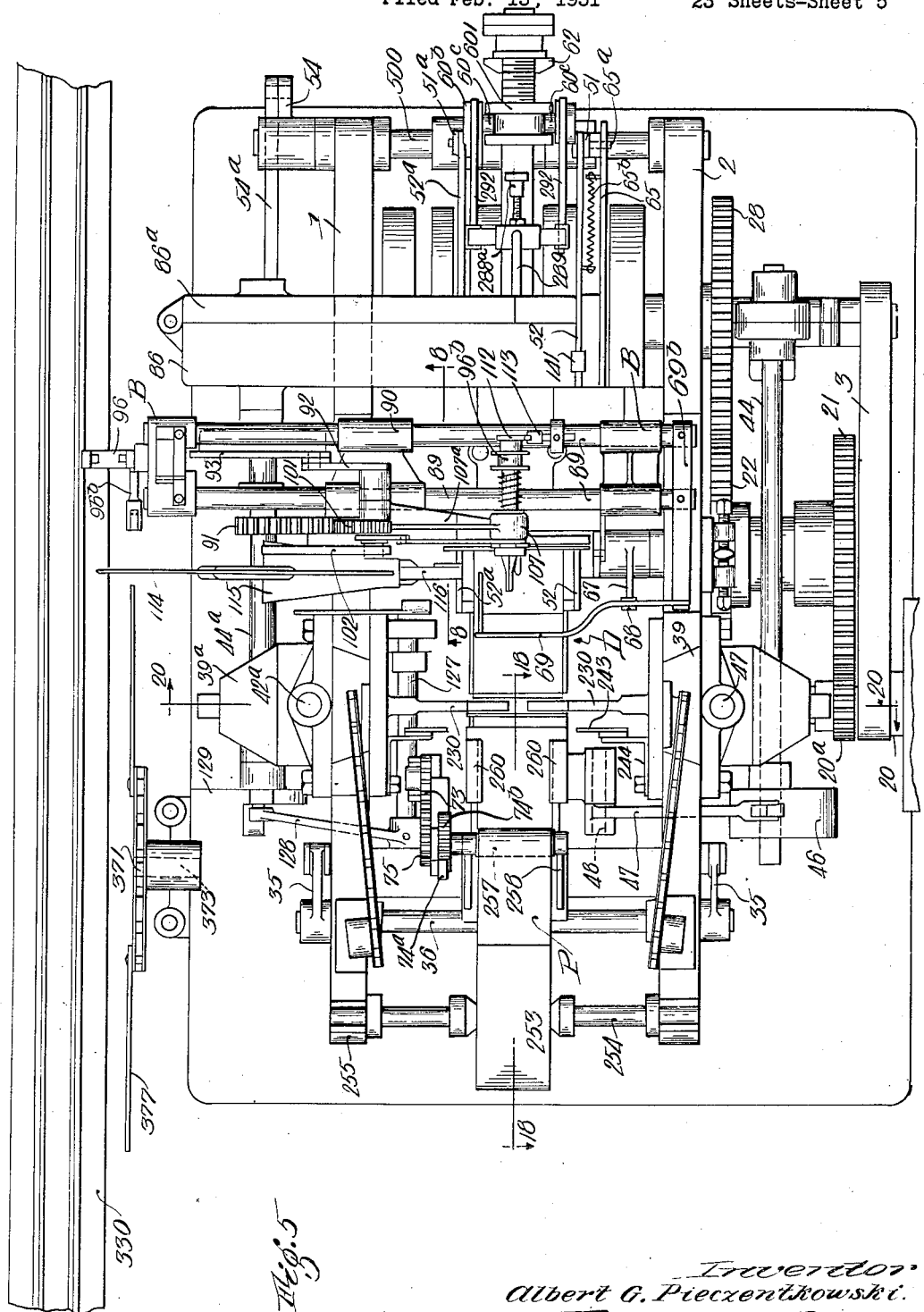

Sept. 19, 1933.  A. G. PIECZENTKOWSKI  1,927,708
PROCESS OF AND APPARATUS FOR WINDING AND WRAPPING STRAND-LIKE ARTICLES
Filed Feb. 13, 1931  23 Sheets-Sheet 6
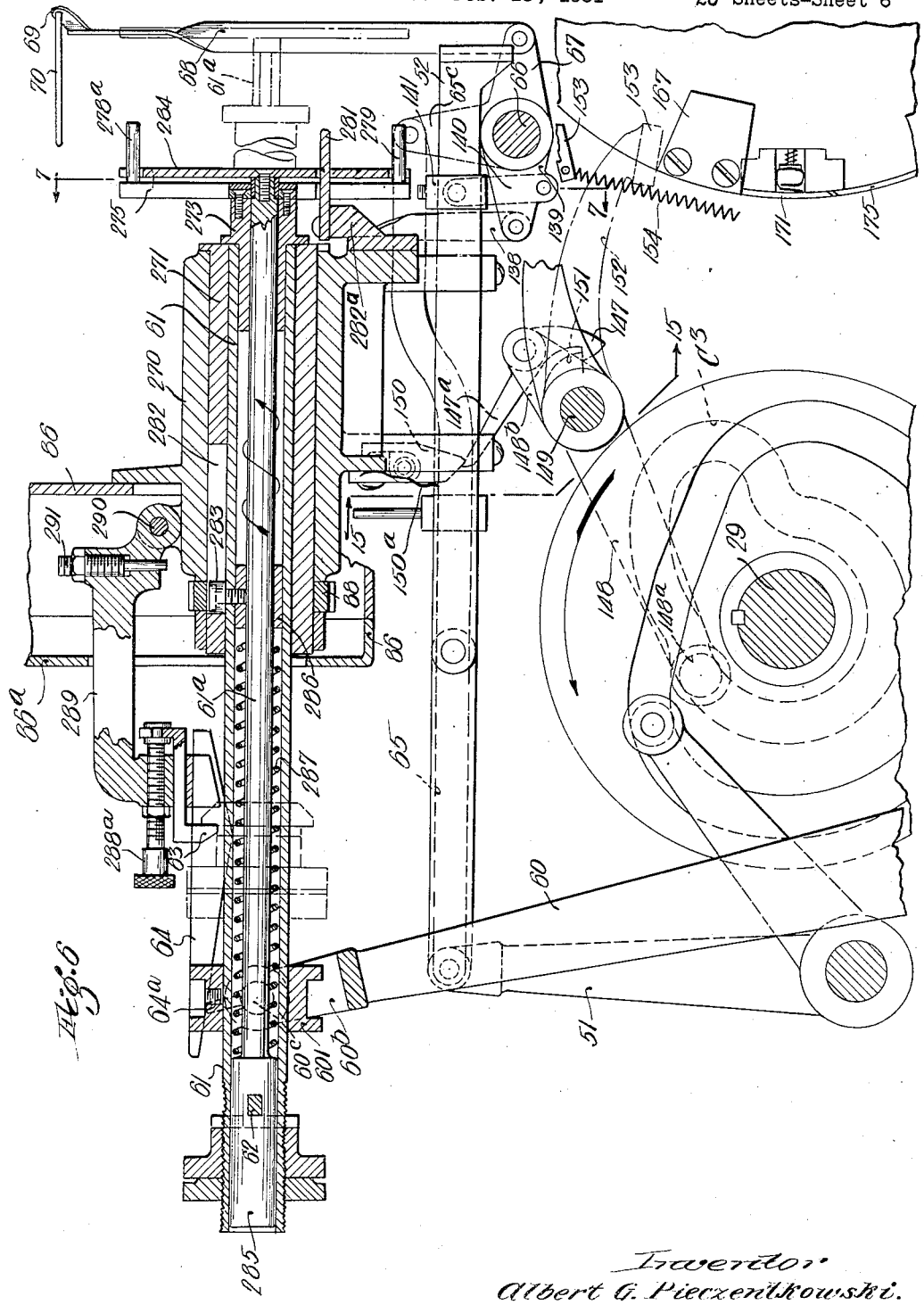

Sept. 19, 1933.  A. G. PIECZENTKOWSKI  1,927,708
PROCESS OF AND APPARATUS FOR WINDING AND WRAPPING STRAND-LIKE ARTICLES
Filed Feb. 13, 1931  23 Sheets-Sheet 7
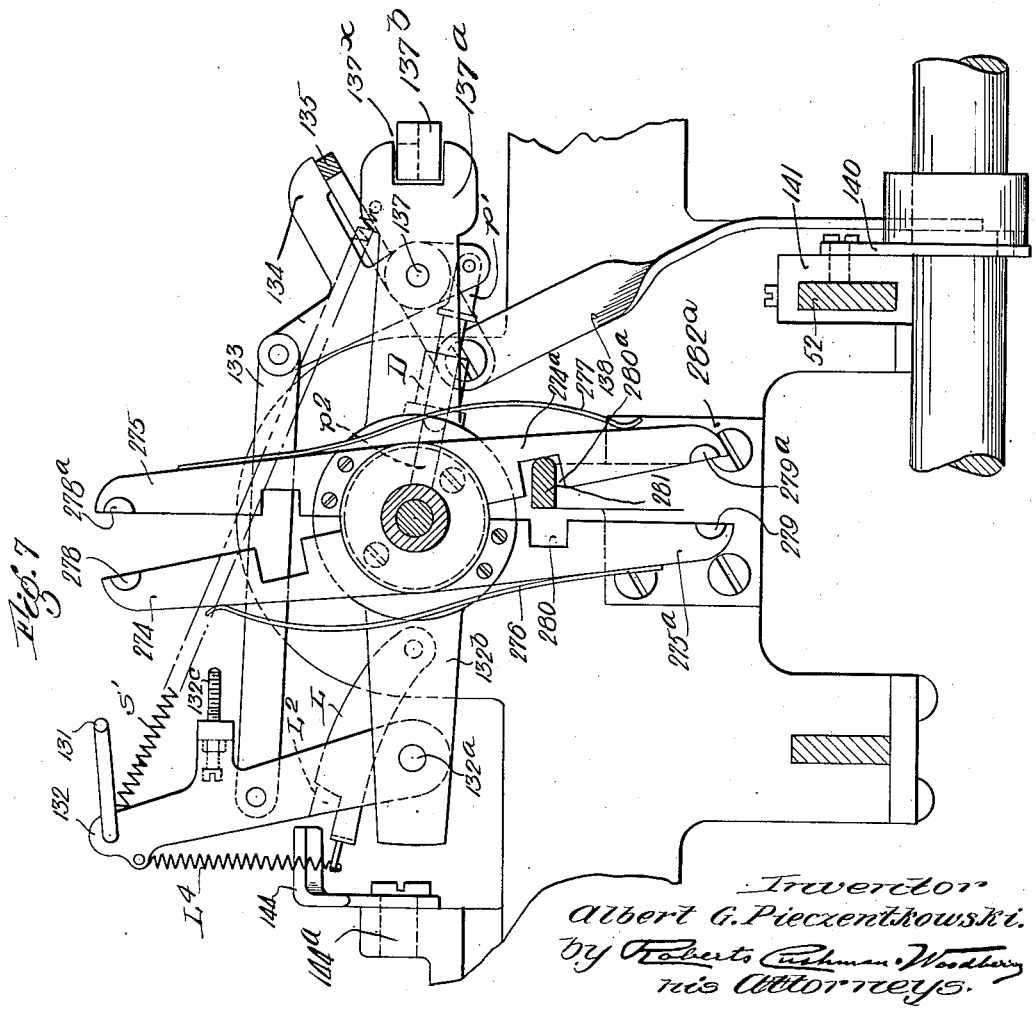

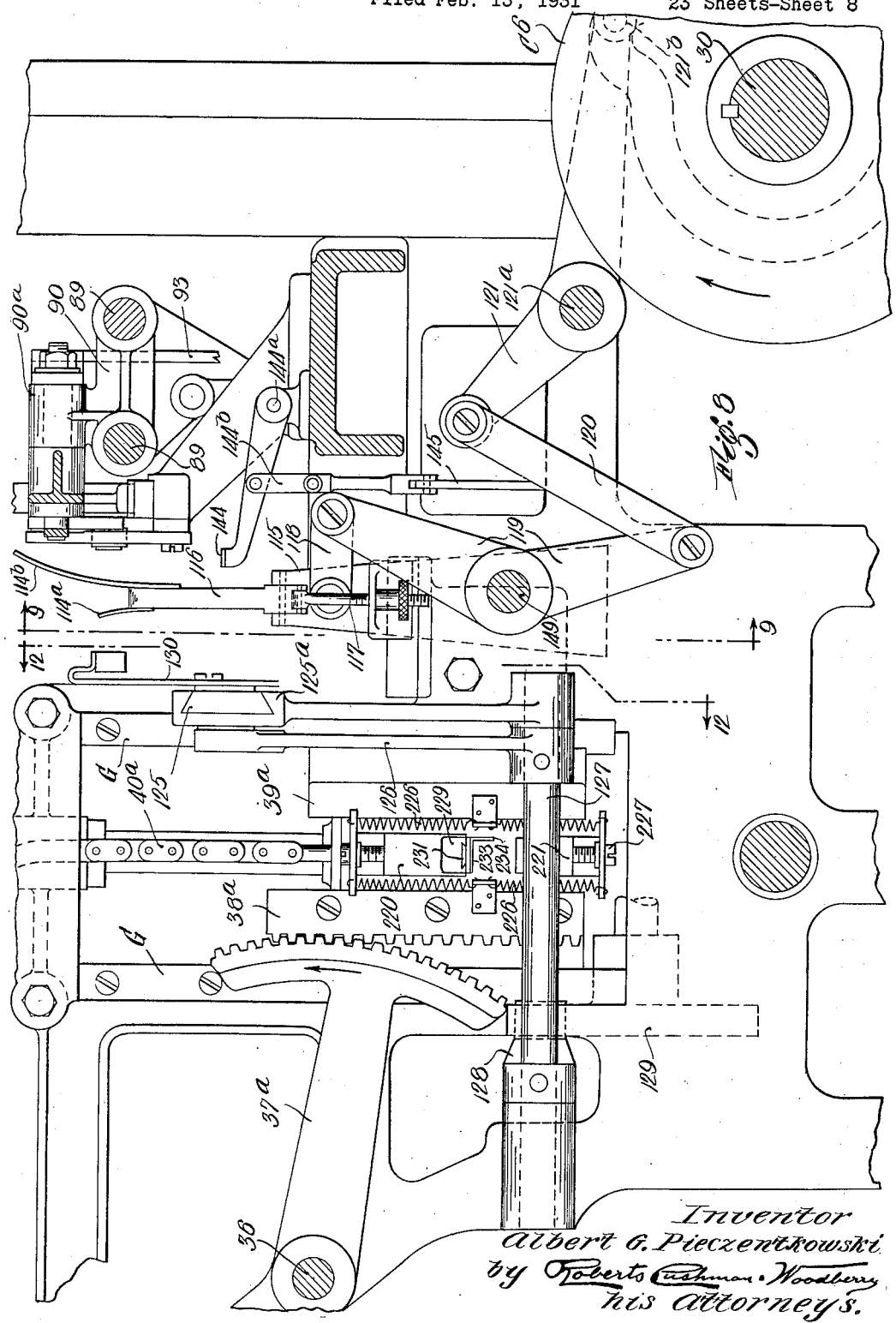

Sept. 19, 1933.   A. G. PIECZENTKOWSKI   1,927,708
PROCESS OF AND APPARATUS FOR WINDING AND WRAPPING STRAND-LIKE ARTICLES
Filed Feb. 13, 1931   23 Sheets-Sheet 9
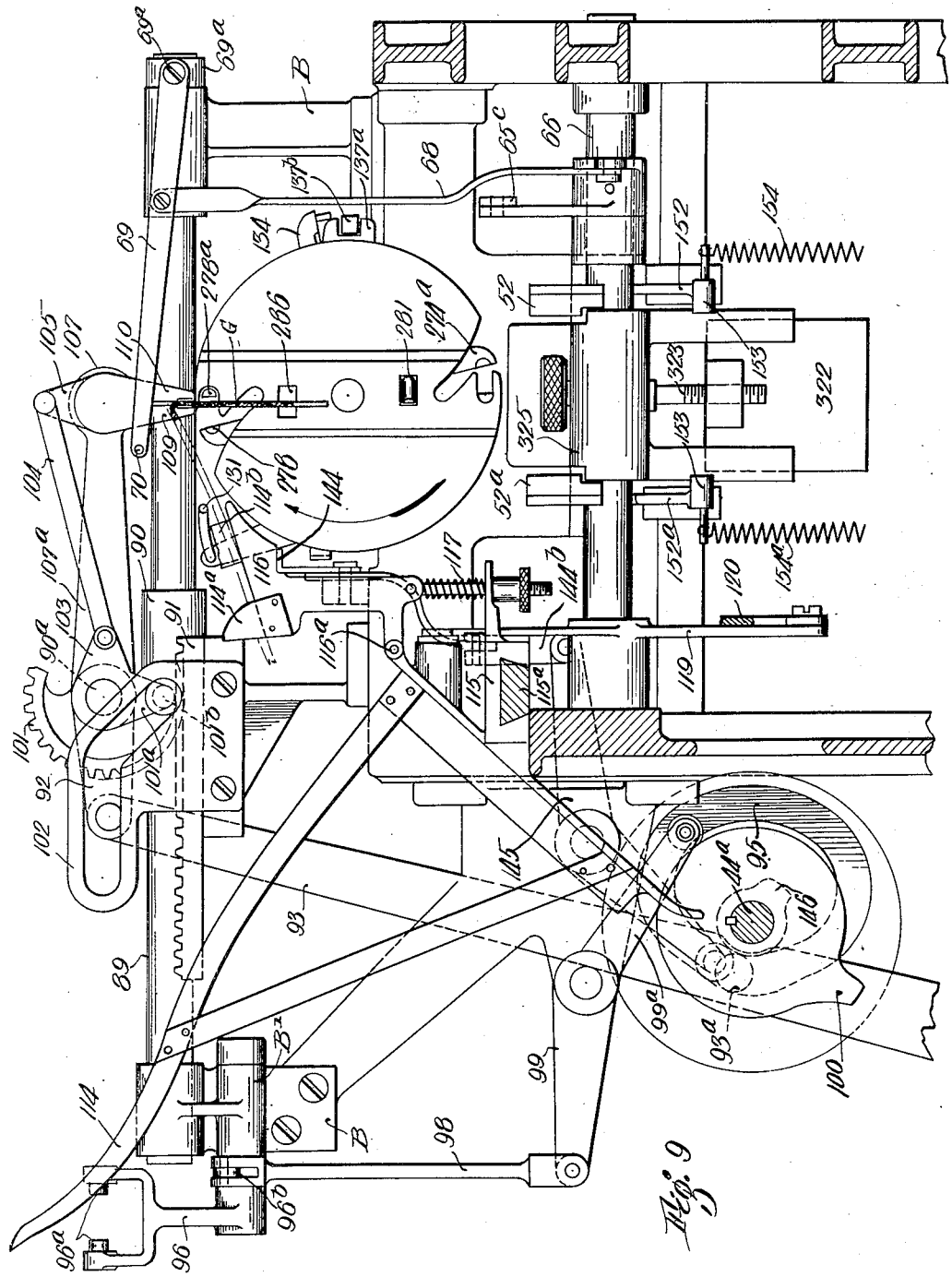

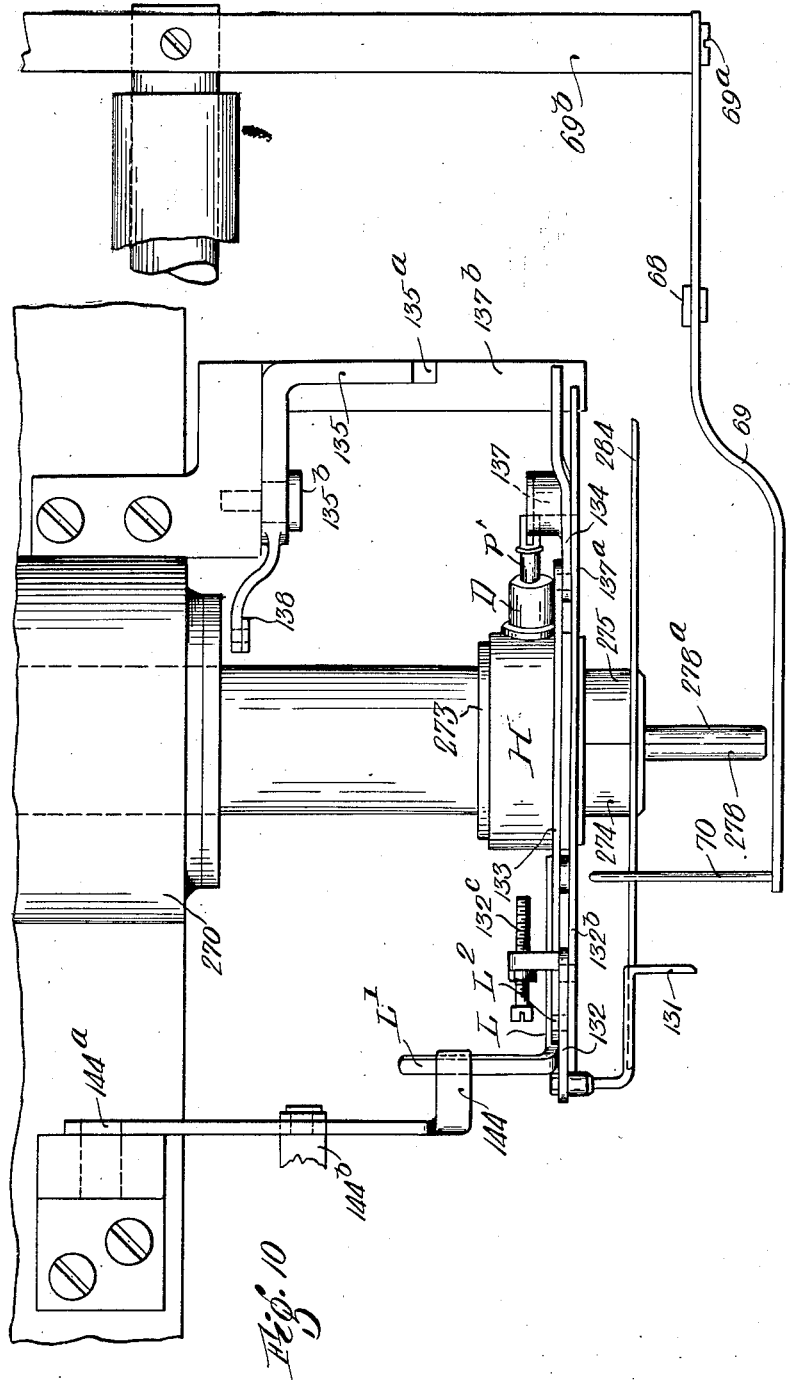

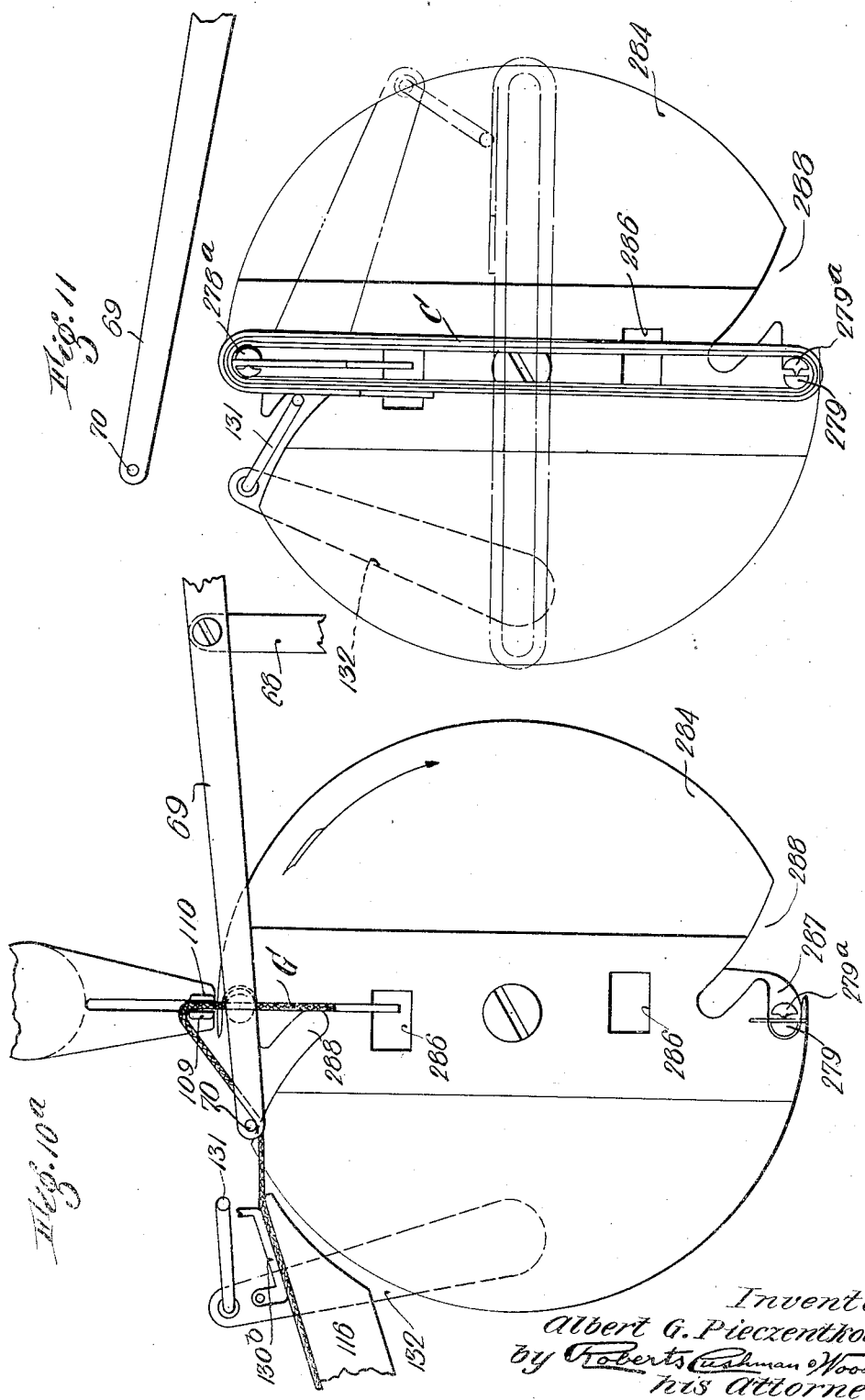

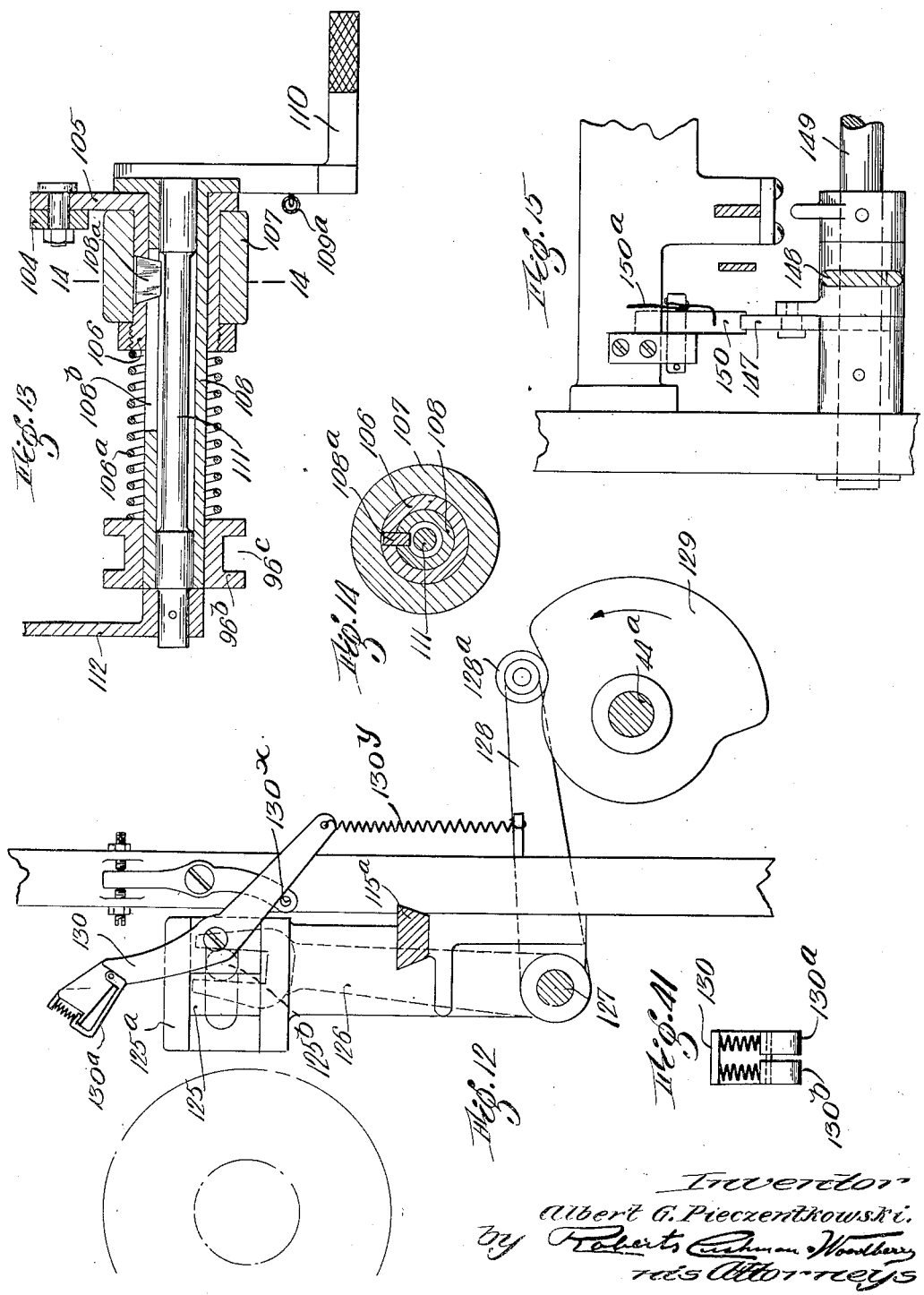

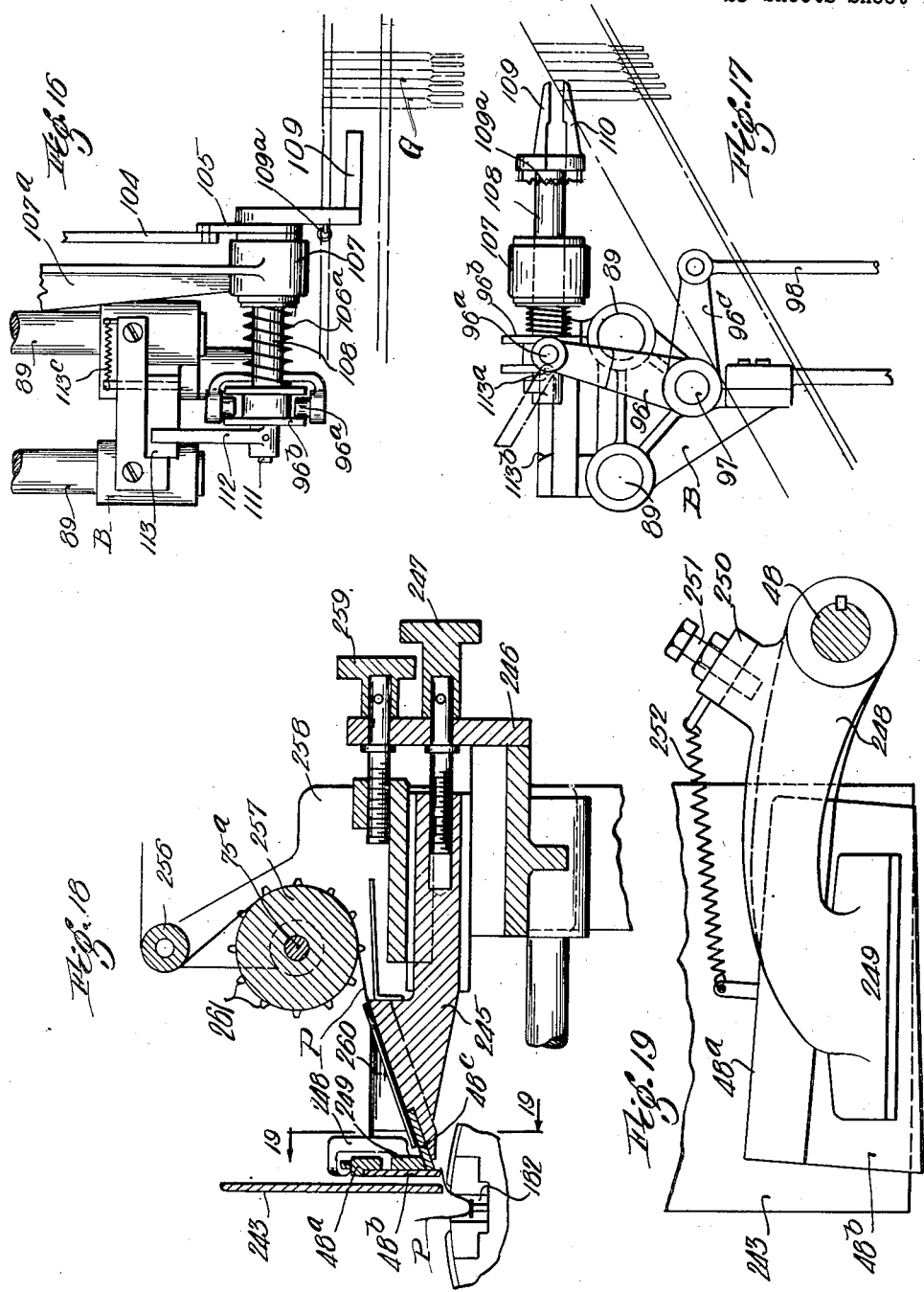

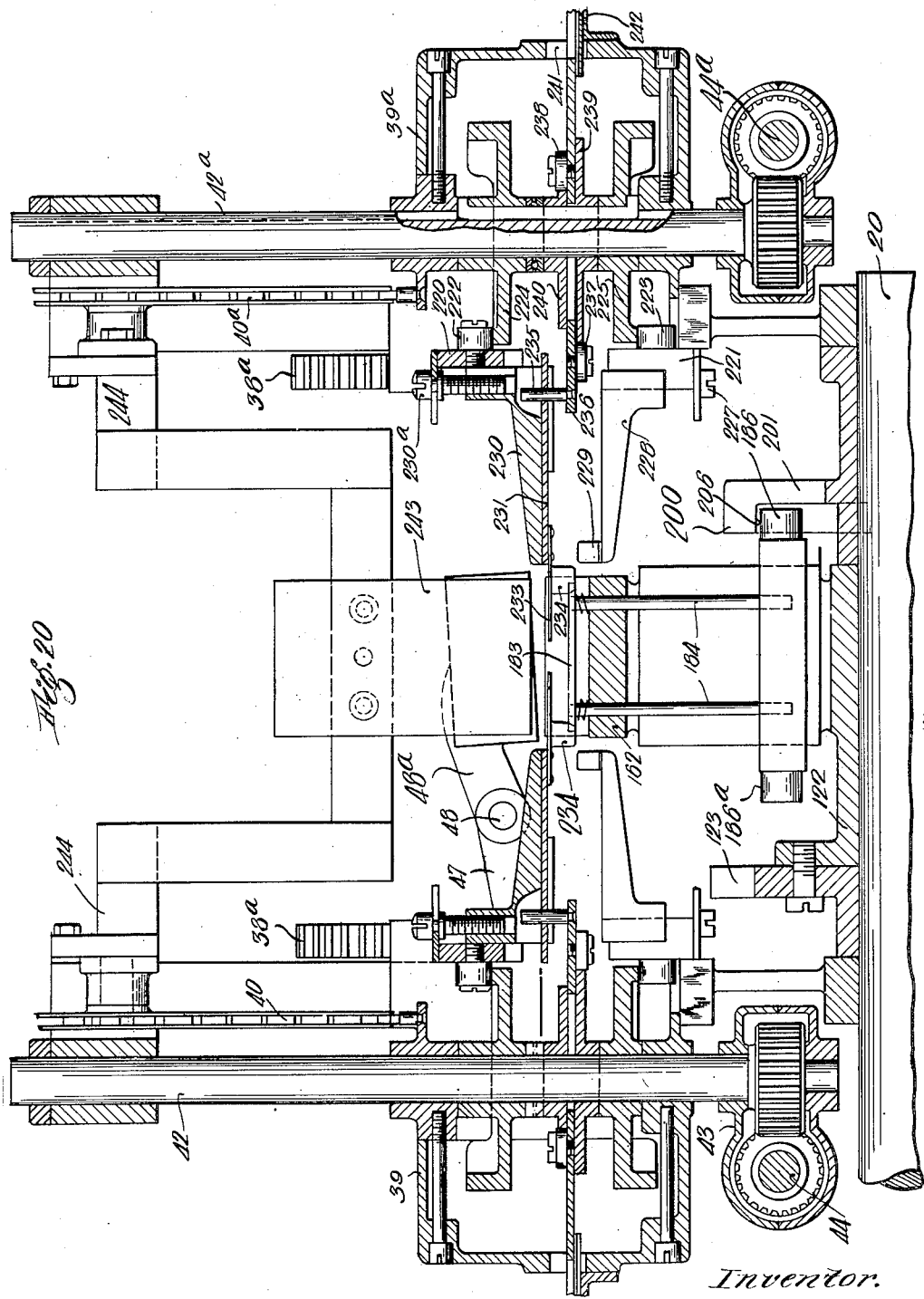

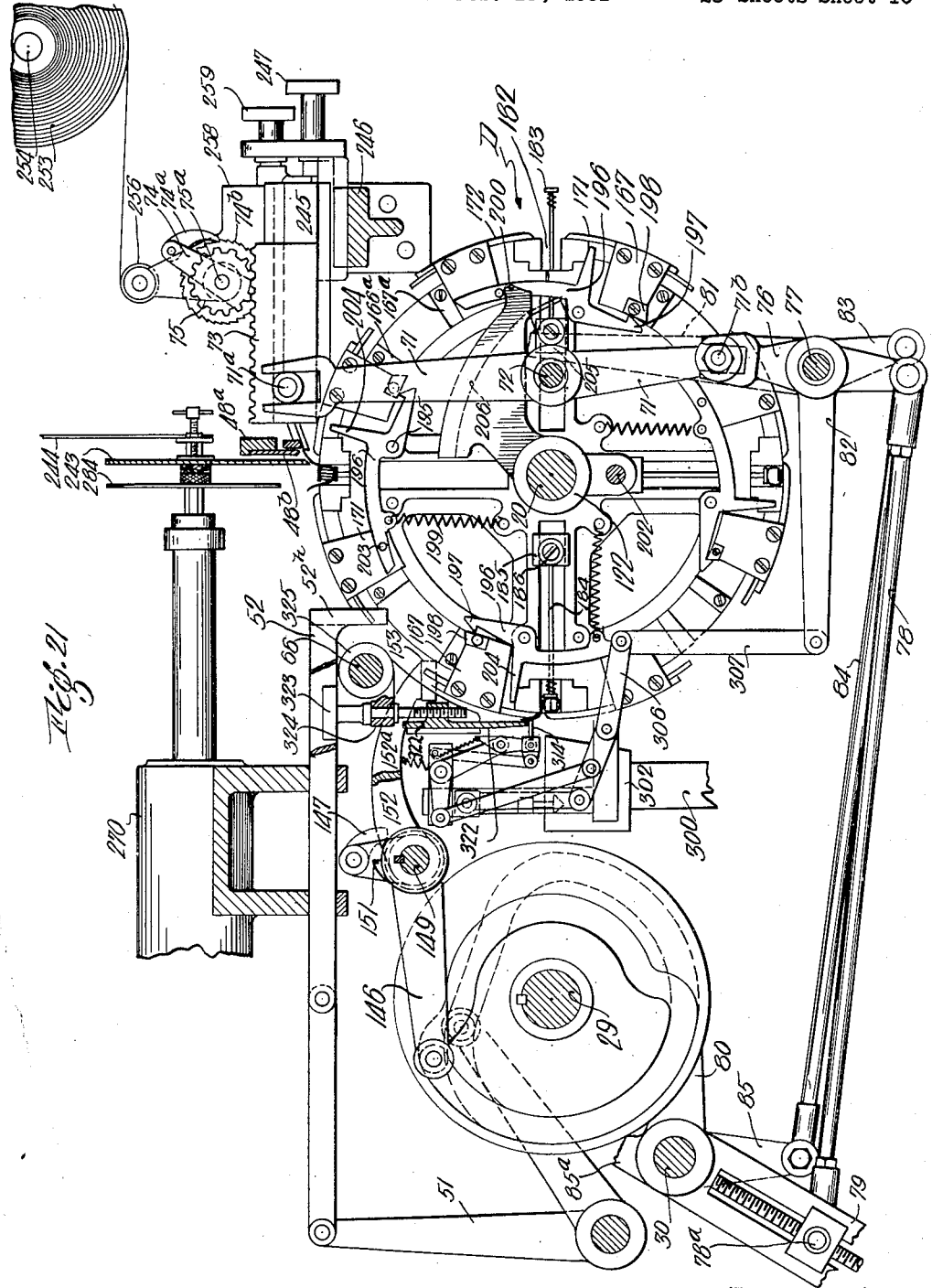

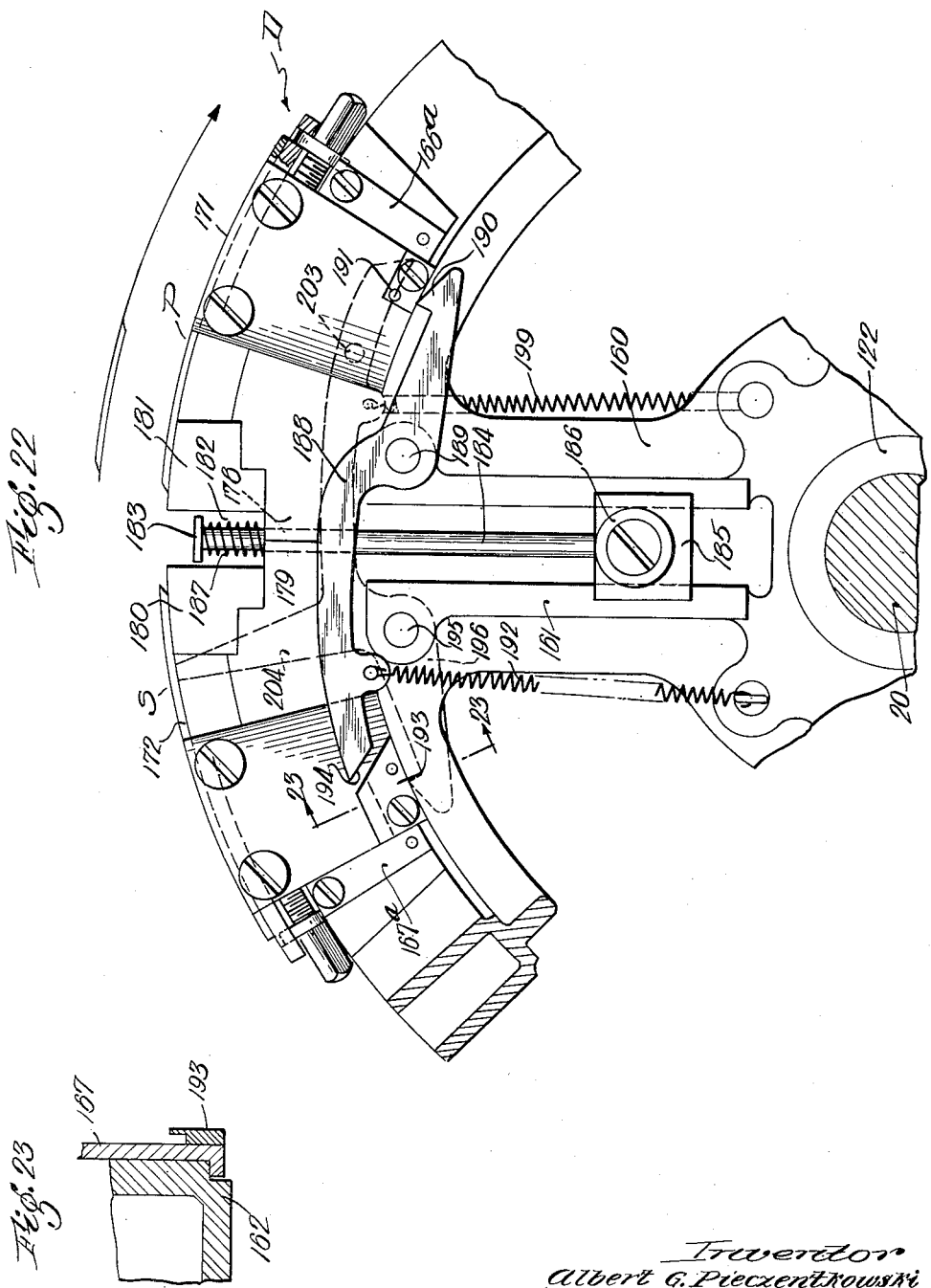

Sept. 19, 1933. A. G. PIECZENTKOWSKI 1,927,708
PROCESS OF AND APPARATUS FOR WINDING AND WRAPPING STRAND-LIKE ARTICLES
Filed Feb. 13, 1931 23 Sheets-Sheet 17
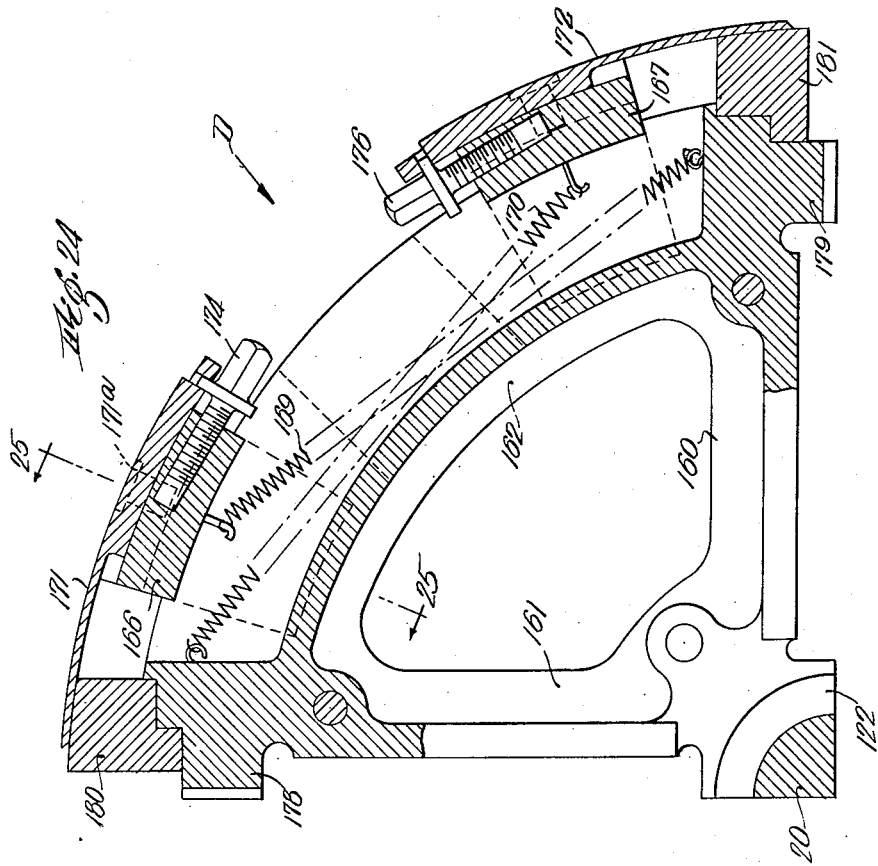
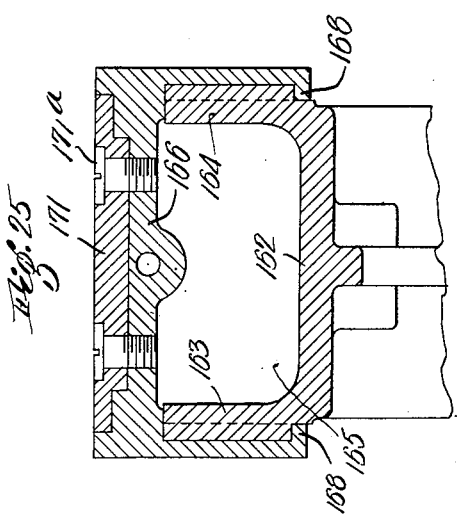
Inventor
Albert G. Pieczentkowski
by Roberts Cushman Woodbury
his Attorneys

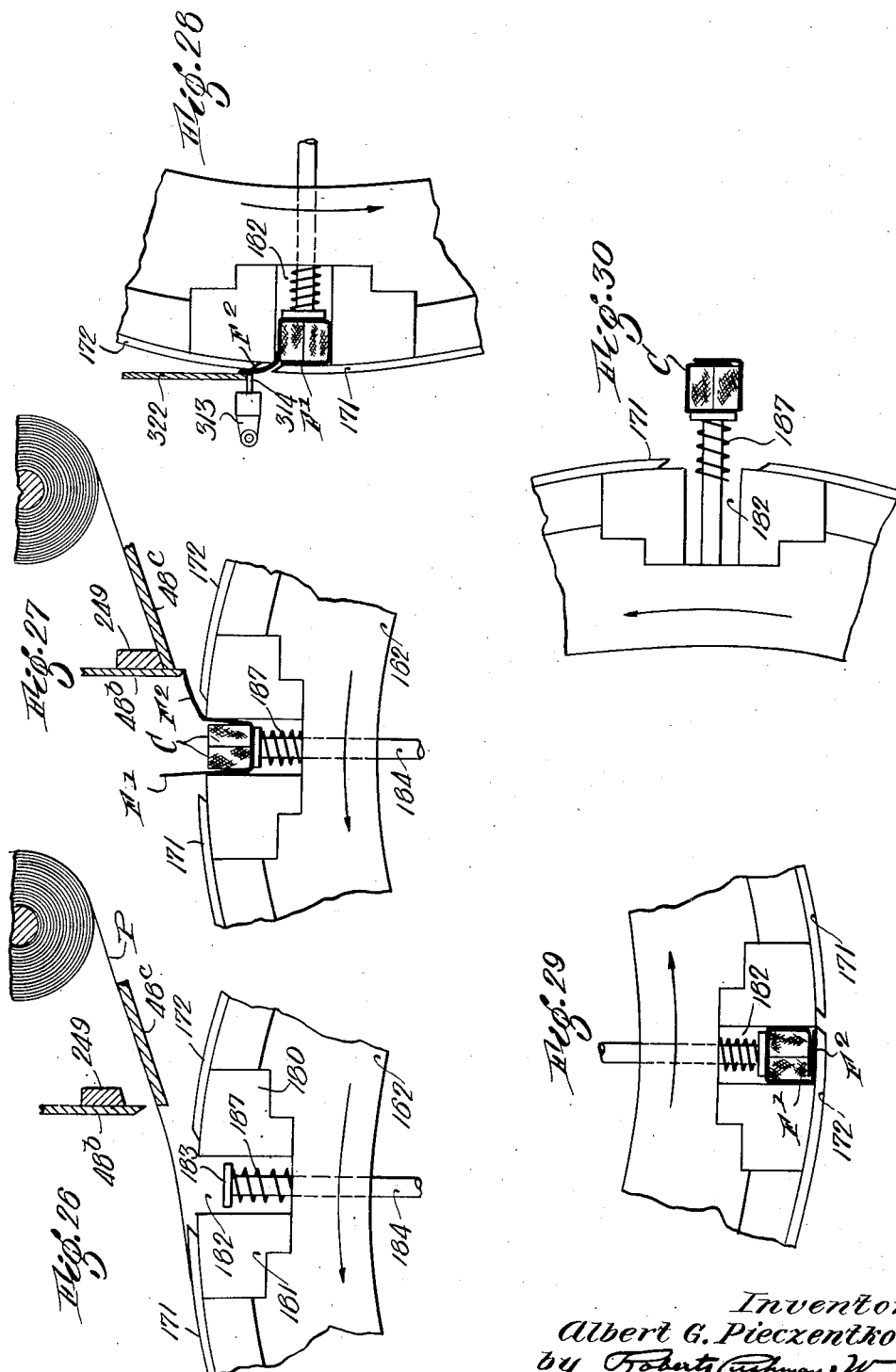

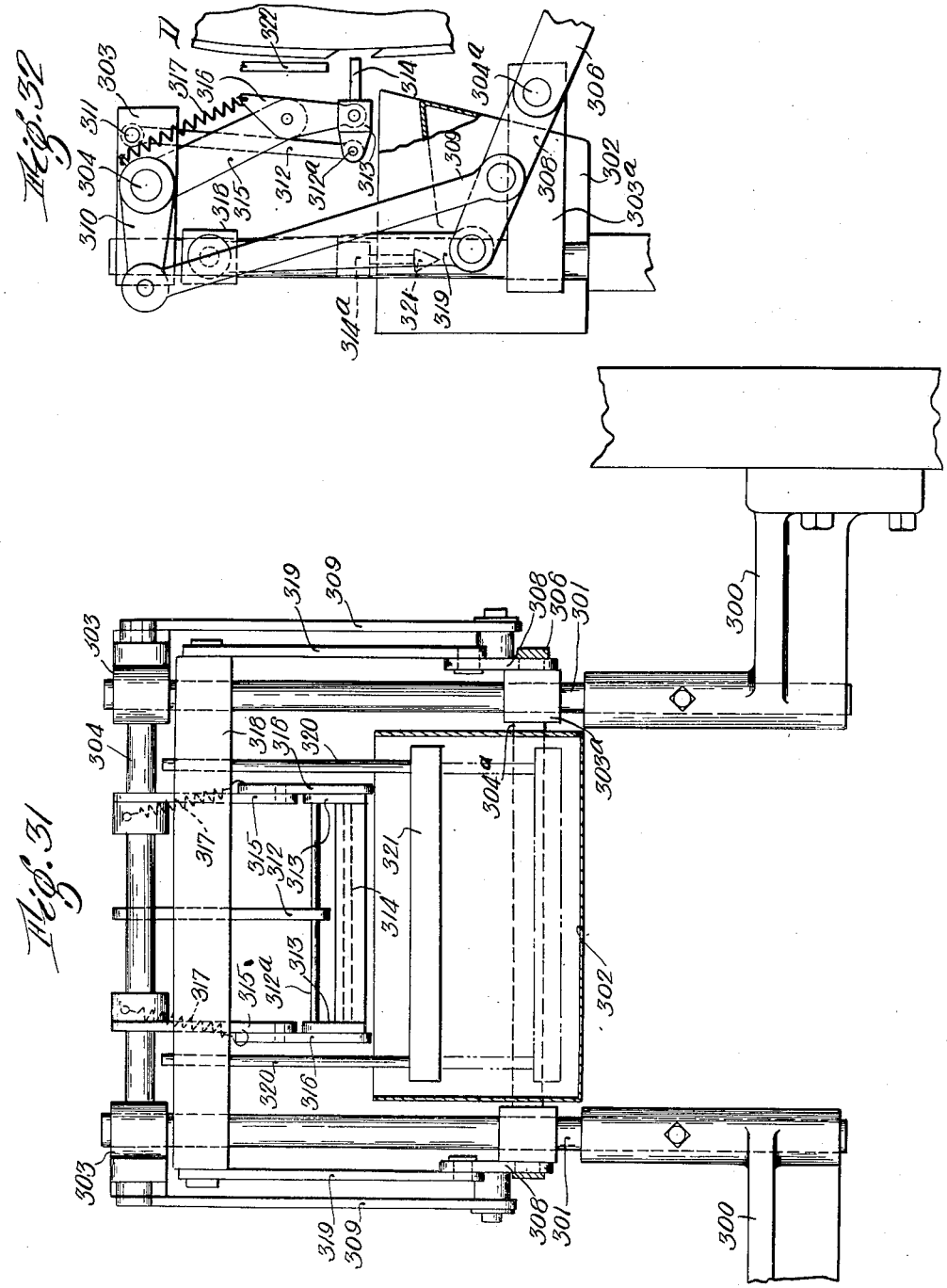

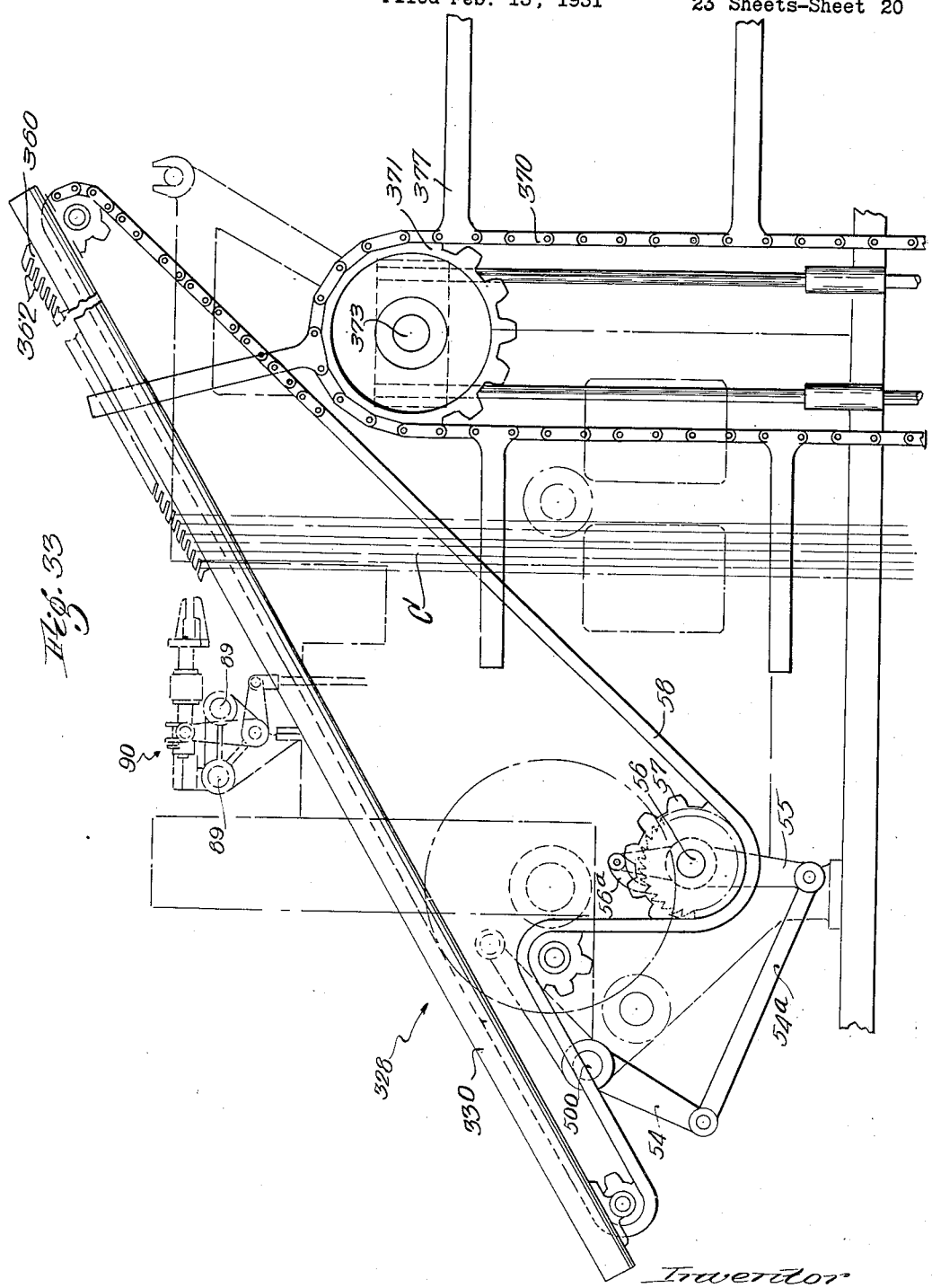

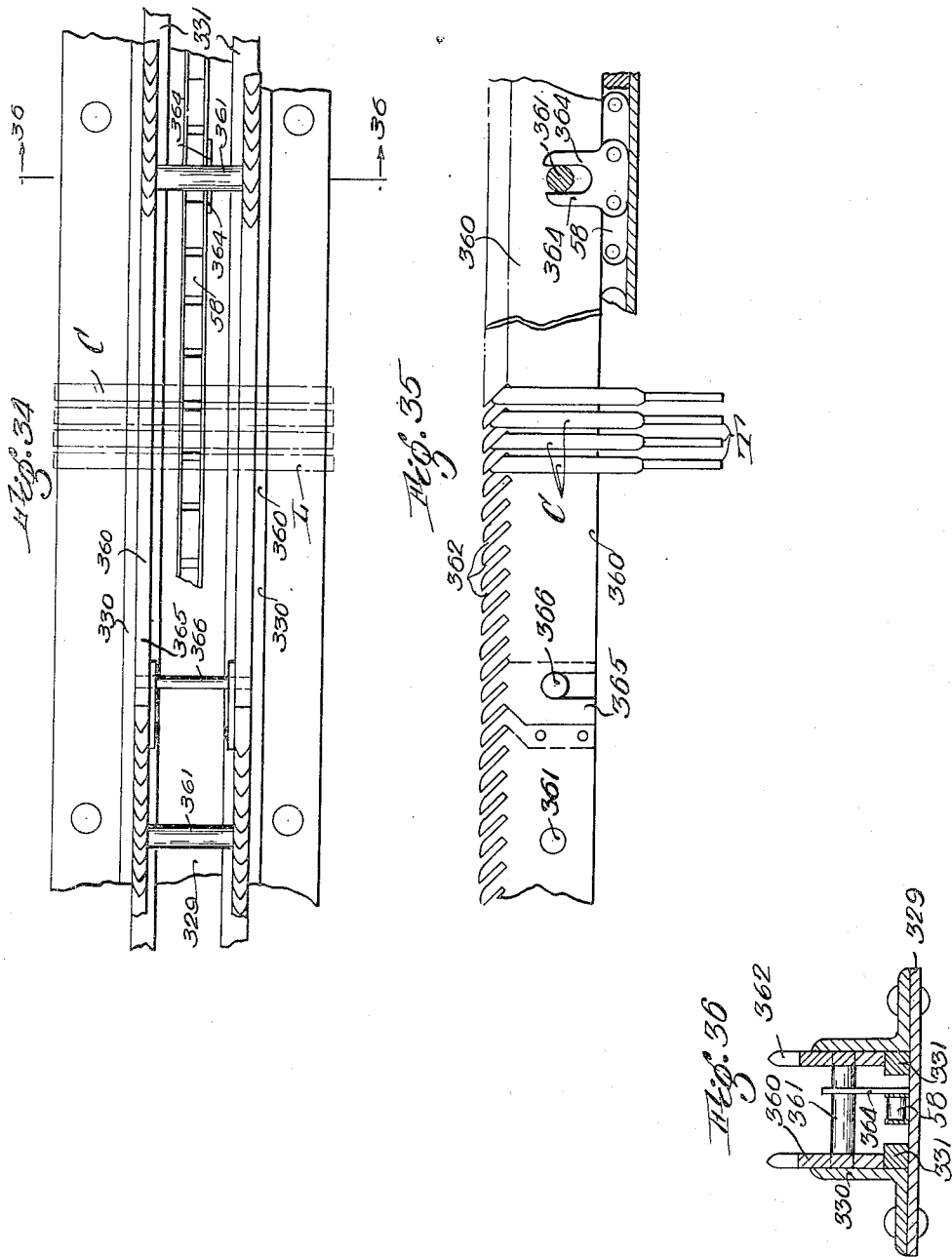

Sept. 19, 1933.  A. G. PIECZENTKOWSKI  1,927,708
PROCESS OF AND APPARATUS FOR WINDING AND WRAPPING STRAND-LIKE ARTICLES
Filed Feb. 13, 1931   23 Sheets-Sheet 22
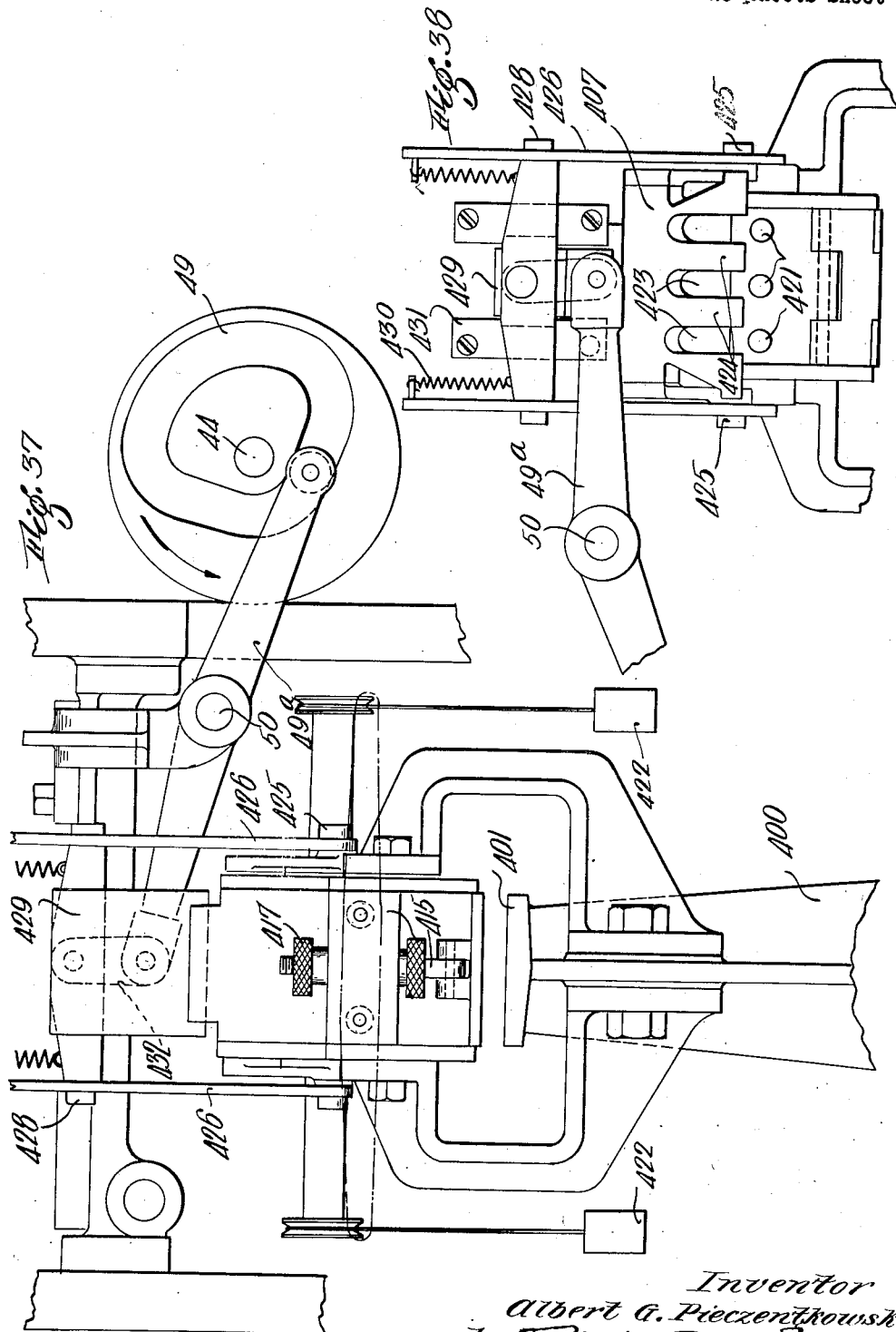
Inventor
Albert G. Pieczentkowski
by Roberts Cushman Woodberry
his Attorneys

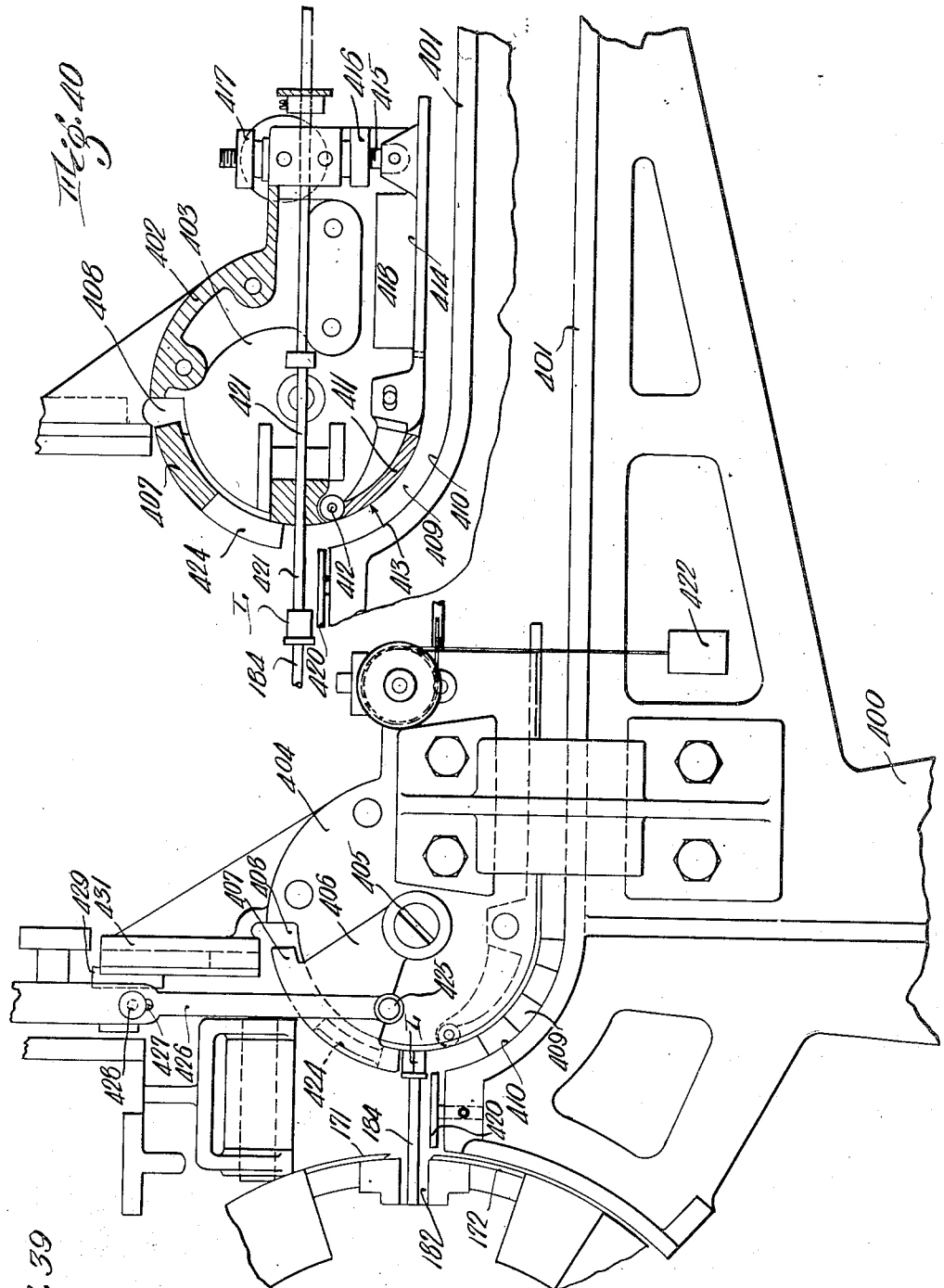

Patented Sept. 19, 1933

1,927,708

UNITED STATES PATENT OFFICE 1,927,708

PROCESS OF AND APPARATUS FOR WINDING AND WRAPPING STRAND - LIKE ARTICLES

Albert G. Pieczentkowski, East Providence, R. I., assignor to Providence Braid Company, Pawtucket, R. I., a corporation of Rhode Island Application February 13, 1931. Serial No. 515,577

101 Claims. (Cl. 28—21)

This invention pertains to a method of and apparatus for packaging independent elongate flexible strand-like articles of predetermined or definite length, for example shoe laces, and while a broader utility is herein specifically disclosed with reference to the packaging of such articles in pairs, this operation, as applied to the packaging of shoe laces, being commonly known as "pairing."

In accordance with usual practice shoe laces are paired by hand, the laces of a pair being simultaneously wound upon a reel and then bound together by means of a paper wrapper. The trade demands that the packaged laces present a neat and attractive appearance, each package being of substantially uniform length and with the ends of the laces closely confined by the wrapper. Moreover when flat or flat-tubular laces are so packaged, each individual lace must be wound without twist to form a flat coil, and two such coils must be bound together in parallel relation to form the package. The preparation of acceptable commercial packages thus requires care and skill and constitutes a considerable item in the cost of lace manufacture.

As usually performed with the assistance of the old and well known hand reel, two laces are wound side by side upon the reel arms so as to form a duplex elongate skein or coil, and while the skein is still on the reel arms the wrapper is applied. This method requires the reel to be idle so far as reeling is concerned while the wrapping operation is being performed. Certain attempts have heretofore been made to provide a semi-automatic machine, as for example by employing a plurality of reels, each individually fed by hand and each of which, while performing the reeling operation, moves to a wrapping position where a wrapper is applied to the reeled lace while another reel of the series is performing the reeling operation. However, in this complicated arrangement, as well as in the old single hand reel, the coil is removed from the reel arms by application of force to the central part of the coil, and as the coil is wound under tension the sudden disengagement of the ends of the skein from the reel arms tends to disarrange the end portions of the coil.

In accordance with the present invention I provide a process of packaging laces, and apparatus useful in performing this process, by means of which laces may be paired in a wholly automatic manner and much more rapidly and cheaply than by the use of the hand reel, and with the formation of a package of uniformly neat and perfect character.

Among other things the improved method comprises as steps the removal of the unwrapped skein from the reel, thus freeing the reel to perform another reeling operation, but includes the step of firmly clamping the end portions of the skein so as to prevent derangement of its constituent turns before it is removed from the reel. The skein is thus held with its ends safely clamped while being delivered to a wrapping mechanism where a wrapper is placed around the central part of the skein. An important feature of the invention thus resides in its provision for keeping the end of the skein under proper control from the time the skein is formed on the reel until it is finally delivered in complete form, thereby ensuring the production of a package of uniform size and shape.

While this process and apparatus are particularly useful in pairing shoe laces, it is conceivable that they may be of utility in packaging other articles, and I employ the term "strand-like article" as comprehensive of any elongate flexible element which it may be desired to reel and wrap, either singly or in multiples to form packages of definite proportions and uniform appearance.

When herein I refer to the reeled article as a "coil", I do so without intention of limitation to a coil of circular contour, and in applying the term "skein" to the reeled article I do so without any implication as to the length of the material being reeled, but only as indicative of its general shape and appearance.

In my copending application Serial No. 349,242, filed March 22, 1929, I have disclosed certain desirable means for transferring strand-like articles such as shoe laces, while held in definite relative position, from a source of supply such as a lace tipping machine to a packaging machine, and I contemplate that such transfer mechanism or its equivalent may be employed in delivering the strand-like articles or laces to the pairing apparatus herein disclosed.

In the accompanying drawings one desirable embodiment of mechanism useful in performing my improved process is illustrated by way of example, and in the drawings:

Fig. 1 is an elevation of the front or drive end of the machine, with the main drive pulley shown in dotted lines and the main shaft shown in section;

Fig. 2 is an elevation of the left or delivery end of the machine, but omitting the delivery mechanism;

Fig. 2ª is a detail view in section on line 2a—2a of Fig. 2, illustrating the intermittent drive mechanism for actuating the transfer drum;

Fig. 3 is an elevation of the rear side of the machine, partly in section, on the line 3—3 of Fig. 2, and with certain parts broken away or omitted;

Fig. 4 is an elevation of the right side of the machine, certain parts being broken away;

Fig. 5 is a plan view of the machine, partly broken away, and with certain parts omitted;

Fig. 6 is a fragmentary vertical section to larger scale on the plane of the axis of the reel shaft;

Fig. 7 is a fragmentary section substantially on the line 7—7 of Fig. 6, showing details of the hold-down device;

Fig. 8 is a fragmentary vertical section, substantially on the line 8—8 of Fig. 5, showing details of the feeding and tensioning means;

Fig. 9 is a fragmentary vertical section substantially on the line 9—9 of Fig. 8;

Fig. 10 is a fragmentary plan view to larger scale illustrating certain of the parts shown in Figs. 7 and 8;

Fig. 10ª is a diagrammatic elevation illustrating the mode of applying the lace to the reel and the operation of the tension device and tucking finger;

Fig. 11 is a view similar to Fig. 10ª, but illustrating the operation of the end hold-down finger;

Fig. 12 is a fragmentary vertical section substantially on the line 12—12 of Fig. 8 showing certain features of the tension mechanism;

Fig. 13 is a vertical section through the axis of the transfer nipper shaft;

Fig. 14 is a section on the line 14—14 of Fig. 13;

Fig. 15 is a fragmentary section on the line 15—15 of Fig. 6;

Fig. 16 is a fragmentary plan view of the transfer nipper mechanism;

Fig. 17 is a fragmentary elevation of the transfer nipper mechanism positioned to receive a pair of laces;

Fig. 18 is a fragmentary vertical section substantially on the line 18—18 of Fig. 5;

Fig. 19 is a side elevation of the paper cutter to larger scale, showing the cutter shaft in transverse section on line 19—19 of Fig. 18;

Fig. 20 is a vertical section on the line 20—20 of Fig. 5;

Fig. 21 is a vertical section substantially on the line 21—21 of Fig. 2, showing the transfer drum in side elevation;

Fig. 22 is a fragmentary side elevation to larger scale showing one section of the drum, with both folding devices retracted;

Fig. 23 is a fragmentary section on the line 23—23 of Fig. 22;

Fig. 24 is a vertical section perpendicular to the drum shaft, showing details of one quadrant of the drum;

Fig. 25 is a fragmentary section on the line 25—25 of Fig. 24;

Figs. 26 to 30 inclusive are fragmentary diagrammatic side elevations showing successive positions which the drum and its parts assume during the wrapping operation;

Fig. 31 is a fragmentary elevation, partly in section, illustrating the paste or glue-applying device;

Fig. 32 is a side elevation, partly in section, of the device shown in Fig. 31;

Fig. 33 is a fragmentary side elevation of the right side of the machine, showing details of the lace-presenting means which are omitted from Fig. 3;

Fig. 34 is a fragmentary plan view of the lace-supporting magazine and parts associated therewith;

Fig. 35 is a fragmentary side elevation, partly broken away, and partly in section, illustrating the magazine device shown in Fig. 34;

Fig. 36 is a vertical section on the line 36—36 of Fig. 34;

Fig. 37 is a fragmentary elevation from the left-hand side of the machine showing the package delivering mechanism omitted from Fig. 2, and to larger scale than Fig. 2;

Fig. 38 is a fragmentary elevation, showing certain of the parts of Fig. 37 from the right-hand side;

Fig. 39 is a fragmentary rear elevation of the package delivering mechanism;

Fig. 40 is a fragmentary view similar to Fig. 39 but with certain parts removed; and Fig. 41 is a transverse section through the pressure elements of the tension device.

The machine preferably comprises the spaced frame members 1 and 2 conveniently formed as castings and held in proper relative position by means of certain fixed transverse members and by the various shafts which have bearings in these frame members. Auxiliary frame members 3 and 4 are also provided for supporting the outer ends of certain shafts, as well as other adjunctive elements disposed at the outer sides of the frame members 1 and 2. The main drive shaft 20 preferably has bearings in the frame members 1, 2 and 3 and may be driven continuously from any suitable source of power as, for example, by means of a belt engaging one of the pulleys P on the outer end of the shaft. The shaft 20 is provided with a pinion 20ª which meshes with a gear 21 mounted on a shaft 23, upon which is mounted a second gear 22. Suitable clutch means is interposed between the gears 21 and 22 for transmitting movement of the gear 21 to the gear 22, such clutch means comprising the clutch actuator lever 23ª (Figs. 2 and 4) mounted on a shaft 24 provided with a bell-crank lever 25 connected by means of the rod 26 for actuation by a suitable treadle, not shown. By depressing the treadle the gear 22 may be clutched to the gear 21, thus starting the machine into operation. Obvious equivalents of this drive means may, of course, be employed if desired.

The gear 22 meshes with a gear 28 mounted on a cam shaft 29 extending transversely across the machine, which shaft carries a series of cam disks provided with groove cams of proper contour, the several cams being designated as C¹, C², etc., as shown in Fig. 4. The specific function of each of these cams will be referred to hereinafter.

A cam follower shaft 30 disposed parallel to the shaft 29 extends through openings in the frame members 1 and 2 and near one end carries a sleeve 30ª provided with an arm 30ᵇ having a follower roll engaging the groove of cam C¹. This sleeve also carries an arm 31 provided at its lower end with an adjustable crank pin 31ª to which one end of the connecting rod 32 is journaled. This rod 32 extends to the opposite end of the frame and is pivotally attached to a to the carriage 115 at the point 116$^a$ (Fig. 9) and is provided with an adjusting screw 117 whereby its inclination may be varied as desired.

The carriage 115 is connected by a link 118 (Fig. 8) to the upper arm of a bell-crank lever 119 having a second arm connected by a link 120 to a second bell-crank 121 fulcrumed at 121$^a$ and having a cam follower roll 121$^b$ engaging the cam C$^6$.

A tension carriage 125 is mounted to slide transversely of the machine in fixed guides 125$^a$ (Figs. 8 and 12) and this carriage is provided with a pin 125$^b$ engaging the forked upper end of a lever 126, secured to a shaft 127 mounted in suitable bearings and provided with an arm 128 carrying a cam follower roll 128$^a$ (Figs. 2 and 12) engaging a cam 129 on the shaft 44$^a$. The tension carriage 125 carries a tension lever 130 provided at its upper end with resilient pressing means adapted to cooperate with the member 116 to tension a pair of laces resting upon the latter. Preferably the yielding pressure elements comprise a pair of shoes 130$^a$, 130$^b$ (Figs. 12, 41) each adapted to engage one of the pair of laces and each being yieldingly urged into contact with its lace by an individual spring. This arrangement is preferable since it ensures proper tension of each lace regardless of the thickness of the other. Preferably the lower end of the lever 130 is provided (Fig. 12) with adjustable cam means 130$^x$ adapted to swing the lever to a greater or less extent as the carriage 125 is moved toward its operative position, and a spring 130$^y$ tends to hold the lever 130 in contact with said cam means.

An end retaining finger 131 (Figs. 10$^a$ and 11), adapted to hold the tips of the reeled laces under proper control and confinement during the transfer of the reeled laces from reeling position to the transfer drum, is mounted upon a lever 132 (Fig. 7) fulcrumed at 132$^a$ upon an arm 132$^b$ mounted on a hub H loose on the reel hub 273. The lever arm 132 is connected by a link 133 to a lever 134 fulcrumed at 137 a second arm 137$^a$ projecting from the hub H. A spring S$^1$, secured to the lever 132 at one end and to the arm 137$^a$ at the other end, tends to swing the arm 132 in a clockwise direction as viewed in Fig. 7, that is to say, in a direction such as to move the retaining finger 131 into operative relation to the laces.

In order to retract the finger 131 from its operative position I provide a setting lever 135 (Figs. 7 and 10) whose operative end is normally disposed in a recess 135$^a$ in a fixed positioner arm 137$^b$ with which a notch 137$^x$ in the end of the arm 137$^a$ engages when the reel is retracted. This lever 135 is fulcrumed at 135$^b$ (Fig. 10) upon a fixed stub shaft and is connected by means of a link 138 (Figs. 6, 7 and 10) to a radius arm 139 loose on the shaft 66. This radius arm 139 is connected by a link 140 to a block 141 secured to the sliding bar 52 above described, the arrangement being such that as the bar 52 is reciprocated, a slight rocking movement is imparted to the radius arm 139, such movement being transmitted by the link 138 to the shorter end of the lever 135, so that the latter may be raised out of the recess 135$^a$. When the reel is retracted to receiving position, the lever 134 overlies the lever 135 and thus when the latter is raised, as just described, the lever 134 is rocked upwardly as shown in Fig. 7, and by means of the conencting rod 133 swings the lever 132 and the retaining finger 131 to the left against the tension of spring S$^1$. A latch L (Fig. 7) carried by the reel arm 132$^b$ is adapted, when the arm 132 is swung to its extreme position, to engage behind a lug L$^2$ of a lever 132, thus holding the latter in retracted position, even though the setting lever 135 may subsequently return to its normal inoperative position. A spring L$^4$ tends to raise the latch L to its operative position. The latch is provided with a release arm L$^1$ (Fig. 10) actuable by an arm 144. The arm 144 is fulcrumed at 144$^a$ and connected by a link 144$^b$ to a lever 145 (Fig. 8) actuated by a cam 146 on the shaft 44$^a$ to release the lever 132 and permit the finger 131 to come into operative engagement with the yarn or lace ends at the proper time.

The hub H is provided with a projecting boss D having a radial bore for the reception of a locking pin P$^1$. When the hub H and the reel hub 273 are positioned as shown in Fig. 7, the pin P$^1$ is in alignment with a hole P$^2$ in the hub 273, and when the pin is permitted to enter said hole the two hubs are locked together. The pin P$^1$ is held in retracted position until the reeling operation is completed, but at the completion of reeling and just as the reel begins to move axially toward delivery position, the latch L is released, permitting the finger 131 to engage the skein on the reel arms and at the same time permitting pin P$^1$ to enter the hole P$^2$ in the reel hub 273. Immediately thereafter the arm 137$^a$ is disengaged from the stop 137$^b$ so that the hub H and the reel are enabled to turn as a unit until the reel reaches the delivery position, thus permitting the finger 131 to remain in contact with the skein so as to keep the ends of the laces under control. On the return of the reel axially toward its initial position, the lever 135 resets the finger 131 and the latch L, and at the same time withdraws pin P$^1$ from the hole P$^2$.

A lever arm 148 (Fig. 6) secured to a sleeve loose on the shaft 149 is provided with a cam follower roll 148$^a$ engaging the cam C$^3$. The sleeve which carries the arm 148 also carries an arm 148$^b$ to which is pivotally secured a latch 147 having a tail 147$^a$ (Fig. 6). This tail 147$^a$ is adapted to engage a pivoted abutment member 150 normally held in operative position by a spring 150$^a$ (Fig. 15) but adapted to yield to permit the arm 147$^a$ to pass when the latter moves in reverse direction. The latch 147 normally engages a tooth 151 fixed to the shaft 149. This shaft carries laterally spaced arms 152 and 152$^a$ (Fig. 9) provided at their ends with wiper closing members 153, whose purpose is hereafter described. The arms 152 and 152$^a$ are normally urged downwardly by means of springs 154 and 154$^a$ (Fig. 9). Normally the arms are held up in inoperative position by the engagement of the latch 147 with the tooth 151, but when the tooth is released the springs 154 and 154$^a$ cause the arms 152 and 152$^a$ to swing suddenly downwardly so that the members 153 at the ends of these arms are caused to strike a sharp blow for actuating the second fold-forming wiper plate of the transfer drum as hereinafter more fully described.

The transfer drum

The transfer drum which constitutes the principal feature of the wrapping mechanism, comprises a sleeve 122 (Figs. 2, 2$^a$, 22, and 24) journaled to turn upon the main drive shaft 20. This sleeve 122 has fixed thereto a star wheel 123 (Figs. 1, 2 and 2$^a$) which meshes with a corresponding drive wheel 124 fixed to the shaft 23, the star wheel and its drive constituting an intermittent drive of the Geneva type adapted to turn the transfer drum through a quarter revolution and then to lock it in fixed position during a cycle of operations of the machine. This transfer drum, as more clearly indicated in Figs. 21, 22, 23, 24 and 25, consists of four independent sectors or quadrants secured to the sleeve 122 in any desired manner, as for example by means of bolts passing through flanges carried by the sleeve.

Each quadrant of the drum D preferably comprises a pair of arms 160 and 161 united by the arcuate rim portion 162. Preferably, as shown, this rim portion is of channel form, providing the spaced side members 163 and 164 (Fig. 25) defining between them the channel or chamber 165. The edge of this rim provides a guide for a pair of slide members 166 and 167 provided with depending flanges engaging the outer surfaces of the walls 163 and 164 of the rim, such flanges terminating in inwardly directed portions 168 engaging ledges at the inner edges of the walls 163 and 164 whereby to retain the members 166 and 167 in sliding engagement with the rim of the quadrant. Springs 169 and 170 disposed within the chamber or channel 165 tend to move the slide members 166 and 167 toward each other. Stops 166a, 167a, (Fig. 22) limit such movement of the slide member.

The slide member 166 carries the primary wiper or folding plate 171. This plate is secured to the slide member by means of screws 171a whose heads are seated flush with the outer face of the wiper plate in an elongate slot 173 (Fig. 2) of the latter, and the wiper plate may be adjusted circumferentially with reference to the supporting slide 166 by means of an adjusting screw 174. The slide 167 likewise carries the secondary wiper or folder plate 175 which is similarly mounted for adjustment by means of a screw 176.

The arms 161 and 160 of the quadrant are provided near their outer ends with projecting lugs 178 and 179 respectively which are adapted to cooperate with the lugs of adjacent sectors to form a continuous rim, and at the same time the outer surfaces of the lugs of adjacent quadrants collectively form the bottom of the package-receiving chamber. Preferably the side walls of this package-receiving chamber are formed by blocks 180 and 181 respectively which may be of hardened material, if desired, and which are set into the ends of the arms 161 and 160 and secured in place in any desired manner. Thus, when the quadrants are united in forming the complete drum (Figs. 22 and 21) the spaced blocks 180 and 181 define the package-receiving chamber 182.

In order to eject the package after completion, an ejector plate 183 is mounted in each chamber 182. Each ejector plate 183 is carried by a rod 184 sliding in an opening formed in the opposed faces of the lugs 178 and 179, and at its inner end secured to a slide block 185 disposed between and having sliding engagement with the opposed arms 160 and 161 of adjacent quadrants. The block 185 carries a cam-engaging roller 186, and a spring 187, interposed between the ejector plate 183 and the bottom of the chamber 182, normally tends to move the plate 183 outward, whereby to eject a package disposed therein.

Referring to Fig. 22, a retaining latch lever 188 for the primary folder 171 is pivoted at 189 upon the outer part of the arm 160. This latch lever is provided with a latch element 190 at its end adapted to engage the edge of a block 191 secured to one of the side flanges of the side member 166 which carries the plate 171, thereby to hold the plate 171 in advanced or operative position in opposition to the section of spring 169. The slide 166 is advanced to permit the latch 190 to engage the blocks 191 by the action of the pusher bars 52 and 52a above described, and when thus advanced and latched, the primary wiper plate 171 extends across the open outer end of the chamber 182 as shown, for example, in Fig. 28. A spring 192 (Fig. 22) retains the latch 190 in engagement with the block 91, when once engaged, until the latch is positively disengaged by the action of a cam block 193 (Figs. 22 and 23) secured to the side flange of the slide member 167 which carries the secondary wiper plate 172. This cam block, when the secondary wiper plate is advanced as hereinafter described, engages the beveled end 194 of the latch lever 188, thus disengaging the latch from the block 191 and permitting the spring 169 suddenly to retract the wiper plate 171.

At the opposite side of the drum from the lever 188, the quadrant arm 161 is provided with a pivot pin 195 (Figs. 21 and 22) upon which is mounted the latch lever 196. This lever is provided with a latch element 197 adapted to engage a block 198 secured to the side flange of the side member 167 (Fig. 21) and thus to retain said slide member in forward or operative position. The slide member 167, with the secondary wiper plate 172, is advanced to operative position by the action of the striker members 153 (Fig. 6), above described, which, when the latch 147 is released from the tooth 151, are suddenly retracted by the springs 154 and 154a so as to strike a sudden blow against the side flanges of the slide 167, thus moving the latter quickly forward in opposition to the springs 170 and causing the cam block 193 to release the latch 190 so that as the secondary wiper plate 172 is advanced, the primary wiper plate 171 is permitted to retract. A spring 199 (Fig. 21) retains the latch element 197 in engagement with the block 193 until the latch lever 196 is positively actuated by engagement with a fixed cam member 200 (Figs. 20 and 21), carried at the outer end of an arm 201 mounted upon the shaft 20, but secured in fixed position by means of a pin 202 (Fig. 21) engaging a part of the frame. This cam is adapted to contact with a pin 203 projecting laterally from an arm of the latch lever 196. In order to ensure retraction of the slide member 167 when released, a push-back arm 204 is provided on the latch lever 196 and thus, when the latch lever is retracted by the engagement of pin 203 with cam 200, this push-back arm 204 engages the side flange of the slide 167 and assists the spring 170 in returning the slide block to its normal inoperative position.

When both wiper plates 171 and 172 are retracted, as shown for example at the right-hand side of Fig. 21, (which is the package-delivery position of the drum) the ejector plate 183 is forced outwardly by engagement of the corresponding roll 186 with a lug 205 (Figs. 1, 2 and 21) carried by the upper end of the lever 81 above described, and which is actuated at this time to move the roll 186 and the rod 184 radially outward. At the completion of the ejecting operation, the ejector plate 183 is moved inwardly by engagement of the roll 186 with a second lug 206ª (Fig. 1) on the lever 81, and upon the next further rotational movement of the drum the roll 186 comes into contact with a fixed cam ledge 206 (Figs. 20 and 21) carried by the arm 201, which positively holds the roll 186 with the ejector plate 183 in retracted position during this quarter revolution of the drum.

Elevator structure

The elevators 39 and 39ª (Figs. 2 and 5) are of like construction. As shown in Figs. 5, 8 and 20, each elevator comprises a casing provided at its inner end with a vertical guideway for the reception of slide members 220 and 221 (Figs. 8 and 20). These slide members are provided with rolls 222 and 223 respectively, which engage actuating cams 224 and 225 keyed to the shaft 42ª to turn therewith, but capable of sliding longitudinally along the shaft with the elevator structure. These cams are of substantially like contour but arranged oppositely so as to move the slides 220 and 221 simultaneously in opposite directions. The slide members 220 and 221 are held in engagement with their respective cams by means of springs 226 (Fig. 8). The slide 221 is provided with an arm 228 vertically adjustable by means of the screw 227 and provided at its outer end with a jaw member 229 adapted to underlie one end portion of the coiled lace. The slide 220 is likewise provided with an adjustable arm 230, adjustable by means of the screw 230ª and provided in its under surface with a dovetail slot for the reception of a slide plate 231 having a resilient hold-down finger 233 secured to its outer end. Preferably the plate 233 is provided with a retaining finger 234 (Fig. 20) at its right-hand edge. The outer end of the plate 231 is furnished with an opening for the reception of a pin 235 projecting upwardly from the end of a slide 236 slotted for the passage of the shaft 42ª and provided with cam follower rolls 237 and 238 actuable respectively by cams 239 and 240 splined to the shaft 42ª. The outer end of the slide 236 passes through an opening 241 in the case of the elevator device and may be guided and supported by a suitable member 242. The cams 239 and 240 are complemental to each other and adapted to move the slide 236 with the plate 231 positively in and out. The pin 235, being elongate, permits vertical movement of the arm 230 relative to the cams 239 and 240 without affecting the transmission of motion from the slide 236 to the plate 231.

The arms 228 and 230 of each elevator device are disposed in the vertical plane of the lace-receiving cavity 182 of the transfer drum D (when such cavity is disposed at the top of the drum in lace-receiving position, as shown for example in Figs. 5, 21, 26 and 27 and 20). Immediately to the left of this vertical plane of the arms 228 and 230, I provide a backing plate 243 (Figs. 5, 20 and 21) suitably supported by means of brackets 244 carried by the machine frame. When the chamber 182 of the transfer drum is in loading position, as above described, the front face of the backing plate 243 lies in the vertical plane of the rear wall of the chamber 182 (Fig. 18). The cutter blade 48ᵇ, above described, is disposed just to the rear of the plate 243.

Cutter and paper feed

As above described, the cutter blade 48ᵇ (Figs. 18 and 19) is carried by a lever arm 48ª (Fig. 2) and the cutter blade cooperates with a normally fixed ledger blade 48ᶜ. The latter is preferably inclined to the horizontal, as shown in Fig. 18, and is mounted upon an adjustable carriage 245 mounted to slide in suitable guides in a bracket 246 supported by the frame. An adjusting screw 247 is provided for adjusting the carriage 245 (with the ledger blade) from left to right to permit the ledger blade to be positioned for proper cooperation with the blade 48ᵇ. The lever 48ª, which carries the cutter blade 8ᵇ, is loose on the shaft 48 and immediately in the rear of this lever, a second lever 248 is fixedly secured to the shaft 48 to turn with the latter. This lever 248 carries a presser or hold-down bar 249 which is adapted to come into contact with the paper resting upon the upper surface of the ledger blade 48ᶜ just prior to the cutting operation. The lever 248 is provided with an overhanging bracket 250 (Fig. 19) having an adjustable abutment screw 251 adapted, as the lever 248 descends, to engage the lever 48ª and thus to depress the cutter blade 48ᵇ. A spring 252, connecting the lever 48ª with the bracket 250, normally tends to raise the blade 48ᵇ.

The paper to form the wrapper is delivered in the form of a ribbon-like strip P from a roll 253 mounted upon a suitable spindle 254 supported by brackets 255 at the left-hand or delivery end of the machine. This paper passes forward over a suitable guide roll 256 (Fig. 18) and then passes down and partially around a drum or roller 257 fixed to the shaft 75ª upon which the ratchet wheel 74ᵇ is fixed. Preferably this drum 257 is mounted in bearings in a bracket 258 mounted to slide from front to rear in suitable guides carried by the bracket 246 (Fig. 18), and may be adjustably positioned by means of the screw 259.

From the drum or roll 257 the paper extends forwardly over the inclined surface of the slide 245 and the ledger blade 48ᶜ, being guided and positioned during this movement by lateral guard members 260 (Figs. 5 and 18). If desired, and in order to ensure accuracy of feed, the paper strip may be provided with a series of equally spaced perforations, preferably one such series adjacent to each of its edges, and the drum or roll 257 may be provided with pins 261 correspondingly spaced. The parts just described are so operatively timed that the pawl 74ª (Fig. 21) is actuated to turn the drum 257 for feeding the paper forward at the time when the cutter blade 48ᵇ and the presser or hold-down member 249 are elevated, the forward feed of the paper ceasing before the blade and presser descent. The feed pawl 74ª and its operating mechanism is so adjusted that the paper is fed forward, as indicated in Fig. 26, so that its free end extends beyond the chamber 182 of the drum and overlaps the primary wiper plate 171.

Reeling means

As above described, the reel is journaled in a fixed bearing 270 (Fig. 6) carried by the machine frame. Within this bearing is a sleeve 271 to which the drive pinion 88 is secured. Within the sleeve 271 is arranged the hollow shaft 61 within which, at its right-hand end (as viewed in Fig. 6) the hub 273 of the reel is secured. This hub supports a pair of levers (Fig. 7) having the upper and lower arms 274 and 274ª, and 275 and 275ª respectively. One of these levers, for example the lever having the arms 275 and 275ª is fixed to the hub while the other is free to turn thereon. Leaf springs 276 and 277 are secured to the arms 275 and 275ª, respectively, the free ends of the springs bearing against the arms 274 and 274ª, thus tending to move the opposed lever arms into contact. The lever arms 274 and 275 are provided with complemental, forwardly projecting pins 278 and 278ª (Figs. 7 and 10) preferably of semi-circular cross section, adapted collectively to constitute a pair of lace-gripping jaws. Likewise the arms 275ª and 274ª are provided with the jaw-forming pins 279 and 279ª respectively. The lever arms are provided with recesses 280 and 280ª in their opposed edges for the reception of a fixed jaw-opening cam 281 (Figs. 6 and 7) projecting outwardly from a bracket 282ª secured to the bearing 270. This cam is of such contour that when the reel is retracted to its lace-receiving position, as shown in Figs. 6 and 7, the cam enters the recesses 280 and 280ª and forces the lever arm 274ª away from the arm 275ª, thus separating the jaw-forming pins to permit the ends of a lace to be introduced between the uppermost pair of pins.

The sleeve 271 (Fig. 6), to which the pinion 88 is secured, is provided with a spiral slot 282 into which projects a roller stud 283 carried by the reel shaft 61. This slot extends longitudinally of the sleeve 271 and peripherally through an arc of 90°. When the reel is in fully retracted position, the stud 283 is at the left-hand end of the slot 282, as shown in Fig. 6. The lever 60 is actuated to move the reel shaft 61 (by means of the pins 60ᶜ entering the groove in the collar 601) from its receiving position to the reeling position, indicated in dotted lines in Fig. 6, and as the reel nears this reeling position, the cam 281 permits the reel jaws to close. The actuating arm 60 remains in a dwell position during the reeling operation, but when this operation is completed the arm 60 again advances in the same direction as previously. However, the pinion 88 is now stationary, and as the roller stud 283 moves relatively to the sleeve 271 along the spiral slot 282 it turns the reel through an angle of 90° from its normal position of rest, as shown in Fig. 6.

In order to strip off the coiled laces from the reel jaws at the completion of the reeling operation, a stripper plate 284 (Fig. 6) is provided. This plate is secured to the rear end of the inner shaft 61ª which is disposed inside of the reel shaft 61 and which may slide longitudinally of the latter. Preferably this inner shaft 61ª is provided with an enlargement 285 at its outer end fitting snugly within the shaft 61, and at its central part slides in a collar 286 fixed inside of the shaft 61, conveniently by the screw which holds the stud 283. A spring 287 is interposed between the fixed collar 286 and the enlarged head 285, thus tending to move the shaft 61ª bodily to the left, as viewed in Fig. 6. The stripper plate 284 is furnished with openings 286 (Fig. 10ª) for the passage of the jaw-opening cam 281, and with openings or slots 287 through which the lace gripping jaws may pass, it being noted that when the cam 281 projects through the openings 286, it holds the reel in a definite fixed position for reception of the laces. This plate is also furnished with slots 288 for the reception of the end-retaining finger 131.

When, as above described, the reel is moved to the right, as viewed in Fig. 6, after the reeling operation is completed, the pins 62 (Figs. 1 and 5) which project from the head 285 of the shaft 61ª out through the slots 62ª in the reel shaft 61 and which now lie in a horizontal plane, pass beneath and lift the latch 63, which immediately drops behind the pins 62 and thus prevents them from retracting. This latch 63 is preferably mounted for adjustment in a left to right direction by means of a screw 288ª carried by a lever arm 289 pivotally mounted at 290 upon the bearing 270. An adjustable stop 291 (Fig. 6) determines the normal vertical position of the latch 63. The lever arm 289 carries the releasing cams 64 disposed at opposite sides of the shaft 61 and adapted to engage contact members 64ª carried by the upper ends or forks 60ᵇ of the actuating lever 60. When the reel is moved to its extreme right-hand position, as viewed in Fig. 6, the pins 62 are caught by the latch 63, as above described, so that when the reel begins its return movement (the lever 60 swinging in a counterclockwise direction, Fig. 6) the stripper plate 284 remains temporarily in its extreme right-hand position, while the reel shaft 61 moves to the left, thus compressing the spring 287. The stripper plate remains in this position until the jaws of the reel have been retracted from the lace, whereupon the movement of the contact members 64ª relative to the cam members 64, raises the latch 63, permitting the spring 287 suddenly to return the stripper plate to its normal position relative to the reel.

Paste applying means

The paste-applying mechanism is disclosed more particularly in Figs. 21, 28, 31 and 32. Thus, referring to Figs. 31 and 32, the machine frame is provided with a pair of brackets 300 carrying scaped vertical posts 301 which support an open-topped receptacle 302 in which any suitable fluid adhesive may be placed. At their upper ends the posts 301 carry brackets 303 providing bearings for a transverse shaft 304. Near their lower ends the posts carry other brackets 303ª having bearings for a second transverse shaft 304ª. A crank arm 306 is fixed to one end of the shaft 304ª and is connected by a link 307 (Fig. 21) to the end of the lever 82 above described. Lever arms 308 are fixed to opposite ends of the shaft 304ª, and links 309 connect these levers to rocker arms 310 fixed to the opposite ends of the shaft 304. A rod 311 (Fig. 32), extending between the brackets 303, supports a link member 312 attached at its lower end to a transverse rod 312ª carrying short links 313 at its opposite ends. These links support the paste-supplying bar 314 which may be of any suitable material and which, in its operative position, is disposed with respect to the transfer drum, as shown in Figs. 28 and 32. A rocker 316 is secured to each of the members 313 and in turn is pivotally secured intermediate its ends to an arm 315 fixed to the shaft 304. Springs 317 connecting the upper ends of the rockers 316 to pins carried by the shaft 304 tend to swing the rockers 316 in a counterclockwise direction, as viewed in Fig. 21.

A substantially horizontal bar 318 is mounted to slide vertically on the post 301 and is connected by links 319 to the ends of the arms 308. Rods 320 project downwardly from the bar 318 and at their lower ends support a dipping bar 321 adapted to move vertically within the receptacle 302.

When the crank 306 is swung in a clockwise direction (Fig. 32), the links 309 are moved upwardly, thus swinging the arms 315 to the left and through the linkage described, causing the paste-supplying bar 314 to move to the dotted line position 314$^a$ in Fig. 32. As this paste-supplying bar moves to the left, the links 319 raise the bar 318 and with it the dipping bar 321. The linkage connections being such that as the paste-supplying bar reaches the dotted position 314$^a$, the dipping bar 321 reaches the position 321$^a$ (Fig. 32) bringing with it a certain quantity of adhesive which is thus applied to the edge of the bar 314. When the lever 306 swings in the opposite direction, the member 321 returns toward the bottom of the receptacle to secure a fresh charge of adhesive, while the applying bar 314 moves back to the horizontal position to apply its charge of adhesive to the paper wrapper, as shown in Fig. 28. The spring connections 317 permit the bar 314 to yield after coming into contact with the paper, so that extreme nicety of adjustment is not necessary.

In order to present the edge of the wrapper in proper position for the application of the paste, a normally fixed smoothing plate 322 (Figs. 21, 28 and 32) is arranged adjacent to the periphery of the transfer drum at a point just above the operative position of the paste-applying bar 314. This plate 322 is supported for vertical adjustment by a screw 323 (Fig. 21) mounted in brackets 324 by a sleeve 325 secured to the shaft 66 above described. The shaft 66 is provided with an arm 326 (Fig. 1) interposed between adjusting screws 327 so that the angular position of the arm may be varied and thus the space between the lower edge of the smoothing plate 322 and the periphery of the drum may be varied.

*Lace presenting means*

The lace-presenting means may comprise a transfer magazine of the general type disclosed in my copending application Serial No. 349,242, filed March 22, 1929. In Fig. 33 of the present drawings this presenting means is designated generally by the numeral 328. As above described, this presenting means comprises a conveyor chain 58 which is moved intermittently by means of the pawl 56$^a$. Preferably this presenting means comprises an inclined trough-like guide having the bottom member 329 (Fig. 36) and the spaced parallel side walls 330. Guide rails 331, which may be of wear-resistant material and which have smoothly finished upper faces, are disposed in the angles between the side walls 330 and the bottom 329, and the chain 58 comprises a run which is disposed between these rails 331 and which may rest upon the bottom 329. As here shown, the transfer magazine proper preferably comprises spaced, parallel rails or bars 360 united at suitable intervals by means of transverse pins 361. The rails 360 are so spaced as to permit the magazine device thus provided to enter between the side walls 330 of the guide trough and to slide longitudinally of the latter, the lower edges of the rails 360 resting upon the guides 331. The upper edges of the rails 360 are furnished with inclined slots 362, each adapted to receive a lace L with one of the tipped ends T of the lace depending a short distance below the rails. The inclination of the slots 362 is such, relative to the inclination of the trough, that when the transfer device, comprising the rails 360, is placed in the inclined trough, the slots 362 are substantially horizontal, as shown in Fig. 33.

At suitable intervals the chain 58 is provided with special links including jaw members 364 spaced for the entry of one of the transverse pins 361 between them, the chain with its jaws constituting driving means for the magazine device.

Preferably, in order that individual magazine units may be of convenient length for handling while at the same time ensuring continuity of the feeding operation, I prefer to provide each magazine unit at one end with a hook member 365 (Fig. 35) and at its opposite end with a transverse pin 366. It is thus possible, as shown in Figs. 34 and 35, to connect adjacent magazine units by hooking the hook 365 of one over the pin 366 of the next feeding unit, the slots being so arranged that the normal spacing of the series of laces is not substantially changed at the junction of two magazine units. These magazine units may be supplied with laces by hand, if desired, or preferably automatically as the laces are delivered from the tipping machine, as for example, by means of the apparatus disclosed in my aforesaid application. The filled magazine unit is placed in the upper end of the trough-like guide and its connecting member 361 is secured within the jaws 364 of the chain. If a magazine element is already within the trough, the newly arriving element is first hooked over the previous magazine element, as above described, and then secured to the chain. As the chain is moved step by step, the magazine elements are carried downwardly along the trough with the longer ends of the laces depending between the trough and the adjacent face of the machine, and at each downward step of the magazine unit the transfer jaws, above described, are actuated to pick off a pair of laces simultaneously from the magazine element. During the downward movement of the magazine element, the depending long ends of the laces are combed out and separated to prevent snarling by the combing mechanism now to be described. This mechanism comprises a sprocket chain 370 disposed in a vertical plane intermediate the magazine guide trough and the adjacent face of the machine proper, such sprocket chain being mounted on sprocket wheels (the upper wheel 371 only being shown), the upper sprocket being carried by a suitable stub shaft 373, while the lower sprocket is fixed to a shaft (not shown) extending transversely across to the front of the machine and provided with a pulley at its forward end, which receives a driving belt 375 (Fig. 1) passing around a pulley 375$^a$ on a shaft 375$^b$ journaled in the frame member 3 and carrying a gear 375$^c$ meshing with the gear 28. The chain 370 is provided with a series of thin arms or blades 377, each secured at one end to a link of the chain and projecting outwardly therefrom to a distance such that the depending arms engage the depending long ends of the laces hanging down from the magazine element and impart a brushing or stroking action as they move downwardly along the laces. Due to the flexibility of the chain and the weight of these arms or blades 377, the latter move downwardly with a more or less vibratory action, which is very helpful in

Package delivering mechanism

After the wrapper has been glued, the package is retained in its recess 182 in the drum by the secondary wiper plate 172 while the drum makes substantially a half revolution which brings the recess and package to delivery position. At the delivery side (left-hand) of the machine (Fig. 1), I provide a bracket 400 (Figs. 37, 39 and 40) carrying a delivery table 401 from which the completed packages may be removed for placing in the shipping containers. The bracket 400 also supports package-compressing devices adapted to receive the packages ejected from the drum and to hold them under confinement, preferably while subjecting them to heat, to ensure setting of the adhesive and to impart a desired predetermined shape to the package.

This compressing device comprises a casing having a circumferentially curved wall 402 (Fig. 40) and spaced vertical side walls 403 and 404, which carry outwardly projecting stub shafts 405 upon which sector-like wings 406 are pivoted to swing. The wings are united by a curved part 407 disposed in a gap or opening 408 in the curved wall 402 of the casing. At its lower part this recess merges into a package-receiving channel 409 defined by a curved part 410 of the table 401 and an adjustable presser device. This presser device comprises a portion 411 pivotally supported at 412 and having the surface 413 curved substantially concentric with the surface 410. At its free end the part 411 is united by a pin and slot connection to a substantially straight ironer member 414 normally substantially parallel to the straight part of the table 401. The outer end of the ironer member 414 is connected to a link 415 which may be adjusted by means of nuts 416, 417 to vary the position of the ironer member 414 with reference to the table. The ironer member preferably is provided with a heating element 418, for example, an electrical resistance coil.

The curved part 410 of the table terminates substantially opposite to the recess 182 of the drum (Fig. 39) when the latter is in package-delivery position, and an adjustable shelf 420 spans the space between the drum and the receiving end of the channel 409, so that a package ejected from the recess 182 by the ejector 183 is moved horizontally by the ejector into the receiving end of the channel. In order to keep the package under confinement during this short movement, I provide one or more sliding abutment rods 421, suitably guided in the casing of the compressing device and disposed substantially in the horizontal plane of movement of the ejector when the latter is in ejecting position. These rods 421 are yieldingly urged toward the left (Figs. 39 and 40) by means of weights 422 (Fig. 1), or equivalent springs, but yield toward the right as the package is thrust out by the ejector plate.

The lower edge of the part 407 constitutes the initial compressing element and is provided with recesses 423 (Fig. 38) to prevent interference with the rods 421, thus forming a plurality of spaced package-engaging fingers 424. The wings 406 are provided with pins 425 to which the lower ends of links 426 are pivotally secured. These links extend up in parallel relation and have vertical elongate slots 427 receiving pins 428 projecting from the ends of a crosshead 429. The upper ends of the links 426 are connected by tension springs 430 (Fig. 38) with the crosshead 429, thus tending to hold the pins 428 in the upper ends of the slots 427. The crosshead is guided to slide in a fixed guideway 431 (Fig. 39) supported by the casing and is moved vertically in the guideway by means of a link 432 connecting it to an arm of lever 49$^a$ above the described. When the part 183 ejects a package from the recess 182 in the drum, the package first contacts with the ends of the rods 421, and as the ejector continues its movement the package is moved across the shelf 420, forcing the rods 421 back and thus keeping the package under compression until it is safely within the channel 409. Thereupon the cam 49, acting through the described connections, moves the fingers 424 down into contact with the top of the package, the continued movement of the fingers forcing the package down into the channel 409. As successive packages are thus forced into the channel, they crowd each other along, and as they thus slowly progress along the confined channel while in engagement with the heated ironer plate 414, the adhesive becomes fully set and the packages assume a definite, uniform and permanent shape so that when they finally emerge from beneath the plate 414 they are in the best possible condition for boxing and marketing.

Operation

The operation of the machine is substantially as follows, it being assumed that a loaded magazine unit has been secured to the chain 58 within the guide trough, and that the transfer nipper carriage 90 has nearly completed its travel to the left, as viewed in Fig. 9, and has swung the arm 107$^a$ in a counterclockwise direction, as viewed in said figure, almost over to the horizontal position. In the following description reference will be made to the reeling and packaging of a single pair of laces, disregarding operations which occur simultaneously with respect to preceding and subsequent laces.

As the arm 107$^a$ completes its downward swing to the left, as viewed in Fig. 9, the groove in the collar 96$^b$ (Fig. 16) receives the oppositely disposed pins 96$^a$ of the lever 96. At the same time the jaw-opening arm 112 contacts with the bridge member 113, thus turning the shaft 111 and separating the nipper jaws 109 and 110. The lever 96 now begins to swing to the right, as viewed in Fig. 17, forcing the shaft 106 with the spaced nipper jaws 109 and 110 to the right, as viewed in Fig. 17, the jaws being separated a distance to permit them to take over a pair of laces disposed in adjacent slots in the transfer magazine. As the open jaws pass over the laces and the shaft 106 reaches the end of its right-hand movement, the arm 112 slips off of the right-hand end of the bridge member 113 and snaps down below the latter, the spring 109$^a$ closing the jaws 109 and 110 with the laces held between them. The arm 96 now swings to the left, retracting the shaft 106 with the nipper jaws until they occupy substantially the position of Fig. 16, but with the arm 112 beneath the bridge 113. The carriage 90 now begins to move to the right, as viewed in Fig. 9, and as it moves, the arm 107$^a$ is swung upwardly, the bridge piece 113 rising to permit the escape of the arm 112 from beneath it without opening the nipper jaws. The carriage 90 continues to move in this way and the arm 107ª to swing to the right, as viewed in Fig. 9, until the nipper jaws occupy the position shown in Fig. 9, with the short ends of the laces depending vertically. While the carriage 90 is thus moved to the right, the guide trough carriage 115 is disposed in its left-hand position, as viewed in Fig. 3, wherein its inclined supporting member 116 is disposed substantially in the vertical plane of the longer trailing ends of the laces depending from the transfer nipper jaws. These depending trailing ends are thus caused to lie on the inclined surface of the support 116, the guide members 114ª and 114ᵇ assisting in centering the laces relatively to the member 116. At this time the tucking finger 70 is in its uppermost position, as shown in Fig. 9, so that the transfer jaws with the laces pass beneath it. The end-retaining finger 131 is also retracted, as shown in Fig. 9, and as the reel is in its most retracted position, as shown in Fig. 6, the end-retaining finger 131 is withdrawn from the path of the advancing laces, the guard 114ᵇ extending upwardly (Fig. 3) to a distance sufficient to prevent accidental engagement of the laces with the finger 131.

As stated, the reel is now in its most retracted position, with the stripper plate 284 also retracted and with the cam 281 holding the reel jaws in separated relation, as shown in Figs. 7 and 9. The space between the upper pair of jaws 278 and 278ª is in the vertical plane of the depending short ends of the laces hanging from the transfer nipper jaw 109 and 110. The lever 60 now begins to swing to the right, as viewed in Fig. 6, advancing the reel with its open jaws toward reeling position. As the reel nears reeling position, the open jaws receive between them the depending short ends of the laces and thereupon the cam 281 disengages the reel jaws, permitting them to close upon the lace.

The closure of the reel jaws takes place substantially simultaneously with the completion of the movement of the nipper jaw carriage 90 to the right, and as the carriage completes movement in this direction the nipper jaw controlling arm 112 comes into contact with a fixed abutment 143 (Fig. 4), which causes the nipper jaws 109 and 110 to separate. At about this time the tucking finger 70 descends, as shown in Fig. 10ª, so as to form a downwardly directed bight of the lace extending from the reel jaws to the support 116. The tension carriage 125 (Fig. 8), which has previously been retracted, now begins to move inwardly and to the left, as viewed in Fig. 12, while the guide trough carriage 115 begins to move to the right, as viewed in Fig. 8, keeping pace with the reel as the latter continues its movement toward reeling position. As the reel continues to move, the laces are pulled out from between the open jaws 109 and 110 of the transfer carriage, and when the reel arrives at reeling position, the tension shoes 130ª and 130ᵇ have been swung inward and rest with resilient pressure upon the laces on the support 116. The reel shaft 61 is now rotated by means of the pinion 88 and the intermediate gearing, above described, and during the rotation of the reel the laces are drawn under tension between the members 130ª and 130ᵇ respectively, and the support 116 and wound in the form of an elongate duplex skein or coil (Fig. 11) upon the opposed arms of the reel. At the end of the reeling operation the latch L (Fig. 7), which has been holding the arm 132 with the finger 131 in the relative positions indicated in Fig. 7, is released by the action of the member 144 (Figs. 7 and 8) and the spring S¹ suddenly snaps the finger 131 downwardly into the position shown in Fig. 11, the tucking finger 70, having been raised just previously. At the same time pin $p^1$ engages the hole $p^2$ in reel hub 273. The retaining finger 131 now holds the outer ends of the laces firmly in position against the coil until the coil has been transferred to the wrapping drum, as about to be described.

After a predetermined number of turns of the reel necessary to coil the laces, as above described, the reel-driving pinion 88 is stopped. The arm 60, which during reeling has occupied a dwell position, now moves further to the right, as viewed in Fig. 6, and during this further movement the stud roll 283 working in the spiral groove 282, causes the reel to make a quarter turn so that its jaws or coil-supporting arms are disposed in a substantially horizontal plane, as shown in dotted lines in Fig. 6.

Just prior to this final advance of the reel, the elevator devices 39 and 39ª have been raised to their uppermost positions with the arms 228 and 230 of each elevator spaced to a maximum distance apart and with the plates 231 advanced toward each other. Just prior to this time the wrapping drum D has been turned to receiving position, as illustrated in Figs 21 and 26, and the paper feed device has advanced the paper strip P, as shown in Fig. 26, until it is disposed across the receiving chamber 182 of the drum, the ejector plate 183 and the wiper plates 171 and 172 all being retracted. In this fully advanced position of the reel, the coiled laces C on the reel arm are disposed in the vertical plane both of the chamber 182 of the drum and also of the arms of the elevators. At the fully advanced position of the reel the skeined laces upon the reel arms are pressed against the positioning or backing plate 243, as shown in Fig. 21, while the ends of the horizontally disposed coil lie between the upper and lower arms 228 and 230 of the opposed elevator devices.

The cams 224 and 225 (Fig. 20) now cause the arms 228 and 230 to approach so as to grip between them the ends of the skein while substantially simultaneously the reel shaft 61 begins to retract. When the reel was being advanced and had neared its most advanced position, the latch 63 engaged the lugs 62 on the shaft 61ª (Fig. 6) and thus locked the stripper plate 284 in its fully advanced position. Now, as the reel retracts, the stripper plate is retained in contact with the skein so that the reel arms are enabled to withdraw from the ends of the skein, leaving the latter confined between the backing plate 243 and the stripper plate 284 at its front and rear, and with its ends securely clamped at top and bottom between the arms 228 and 230 of the elevator devices. As the reel continues to retract the cam members 64 eventually lift the latch 63, thus permitting the spring 287 to retract the stripper plate 284, but by this time the depending ears 234, carried by the slide plates 231 of the upper elevator arms, have descended sufficiently to confine the ends of the skein at that side from which the stripper plate has been withdrawn. As the reel returns to its original position, the arm 137ª (Fig. 7) engages the positioning arm 137ᵇ, while the resetting lever 135 engages the arm 134 and tips the latter as shown in Fig. 7, to the left to permit the latch L to re-engage the lever 132. At the same time the cam 281 enters between the reel jaws so as to restore them to the open position ready for a succeeding operation.

The elevator devices descend, carrying with them the skein gripped between their upper and lower arms and with the hold-down fingers 233 extending almost to the center of the skein. At about this time the cutter 48$^b$ and presser 249 (Figs. 18, 19, 20 and 27) descend and sever the advanced portion of the paper from the main body of the paper strip, leaving this severed part extending across the chamber 182. This cutting operation preferably takes place just after the descent of the elevator devices has carried the skein into the chamber 182, and during the final portion of such descent has depressed the ejector plate 183 against the tension of its cushioning spring 187. The descent of the coil into the chamber 182 forces the advanced end portion of the paper strip downwardly into the chamber beneath it, as shown in Fig. 27, and as the paper strip is severed, the push rods 52 and 52$^a$ are quickly advanced, and by engagement with the slide 166 push the primary holding or wiper plate 171 across the chamber 182 and above the laces C disposed therein. This movement of the wiper plate 171 bends or folds inwardly the upwardly projecting portion F$^1$ of the paper wrapper, the wiper plate being latched or locked in this position by means of the latch 190 (Fig. 22). The cams 239 and 240 of the elevator devices now retract the slide plates 231 with their hold-down fingers 233.

The transfer drum D, with the skein C and its paper wrapper snugly held between the resiliently supported ejector plate 183 and the wiper plate 171, now begins to turn to the left, as viewed in Fig. 21, making a quarter revolution and then stopping. During this movement the edge portion P$^2$ of the paper wrapper projects outwardly between the edges of the plates 171 and 172 and eventually comes into contact with the smoothing plate 322 which moves it backwardly into the position shown in Fig. 28. While in this position, the paste-supplying bar 314 is swung toward the drum D and comes into contact with part P$^2$ of the wrapper at a point just below the lower edge of the smoothing plate 322. The paste-supplying member 314 is now retracted and the drum starts to make another quarter turn. At this time the latch 147 (Fig. 6), releases the tooth 151 on the shaft 149 and permits the springs 154 to snap the strikers 153 downwardly so as suddenly to move the slide members 167 with the secondary wiper plates 172 in a counterclockwise direction, as viewed in Figs. 21 and 28. As the slides 167 thus begin to move, they release the latches 190, permitting the plates 171 to be retracted by their springs while the plates 172, wiping across the partially formed package in the chamber 182, sweeps the adhesively coated flap F$^2$ over onto the flap F$^1$. The drum now completes another quarter turn, holding the package firmly compressed, as indicated in Fig. 29, and during this portion of its movement and the subsequent quarter turn of the drum, the adhesive on the paper wrapper becomes at least partially set, while at the same time the prolonged pressure upon the coil tends to give it a definite shape. When the drum nears the end of the third quarter revolution, the pin 203, which projects from the latch 196 holding the secondary wiper 172 in position, engages the fixed cam 200, thus releasing the secondary wiper 172 and permitting it to retract, as shown at the right-hand side of Fig. 21. With both plates 171 and 172 thus retracted, the package is free to be removed from the chamber 182 and at this time the roll 186 (Fig. 22) engages the fork 205 of the lever 81 and by actuation of the lever, the ejector plate 183 is forced outwardly, thus delivering the wrapped coil into the package compressing mechanism. As delivered by the ejector plate 183, the package is forced into the channel 409 where it is held in close confinement under pressure and heat until it eventually reaches the end of the channel, at which point it is delivered onto the table 401 and thence into a receptacle for packing or to a conveyor for transfer to the packing operator's position. After ejection of the package, the ejector plate 183 is retracted and is held in retracted position by engagement of its roll 186 with the cam ledge 206 until the drum has returned to its initial position.

It will be noted that the drum is provided with four of the recesses 182, and during each quarter revolution of the drum the reel and adjunctive parts perform a complete cycle of operations, so that a plurality of packages are undergoing completion at the same time. Obviously, the drum could be provided with a greater number of package-receiving recesses or chambers, if desired, and I contemplate that instead of a drum, an endless conveyor of any suitable type, or other equivalent means provided with package-receiving recesses may be substituted for the drum.

While I have herein described mechanism which is useful and desirable for the intended purpose, I wish it to be understood that various changes in form, size and proportion of parts may be made and that equivalents may be substituted for the elements here employed without departing from the spirit of the invention.

I claim:

1. That method of pairing shoe laces which comprises as steps forming a duplex skein in which each lace of a pair is so coiled that its component turns are disposed in definite relation, clamping the end portions of the duplex skein at the completion of the skein-forming operation, conveying the skein with its ends still clamped to a wrapping position, and engaging a paper wrapper with the central part of the duplex skein.

2. That method of packaging a strand-like article which comprises as steps winding such an article to form a skein whose constituent turns are disposed in definite relation, clamping the end portions of the skein to prevent derangement of its turns while moving it from a winding to a wrapping position, and engaging a wrapper with the skein.

3. That method of packaging a strand-like article which comprises as steps winding such an article to form a skein, clamping the end portions of the skein to avoid derangement of its constituent turns, and stripping the skein from the reeling means and engaging a wrapper with the central portion of the skein while keeping its end portions clamped.

4. That method of pairing shoe laces which comprises as steps preparing a duplex skein in which each lace of a pair is wound upon itself to form an elongate pancake coil, the two coils being disposed in face to face contact, clamping the end portions of the duplex skein to prevent relative derangement of its constituent turns while moving it from the position in which it was prepared to a wrapper-engaging position, and applying a wrapper to the central portion of the skein.

5. That method of packaging a strand-like article which comprises as steps winding the article upon a reel to form an elongate skein, holding the reel stationary while clamping the end portions of the skein and stripping the skein from the reel, moving the skein, while still holding its ends clamped, to a wrapper-engaging position, partially embracing the central portion of the skein with the wrapper, and while completing the application of the wrapper moving the skein to a delivery position.

6. That method of packaging a shoe lace which comprises as steps winding the lace upon a reel to form an elongate skein, holding the reel stationary while clamping the end portions of the skein and stripping the skein from the reel by relative movement of the skein and reel substantially at right angles to the length of the skein, moving the skein, with its ends still clamped, in a direction substantially at right angles to its aforesaid movement, whereby to transfer it into wrapper-engaging position, and applying a wrapper to the central part of the skein.

7. That method of pairing shoe laces which comprises as steps winding a pair of laces simultaneously on a reel to form an elongate duplex skein, holding the reel stationary while clamping the end portions of the skein, stripping the skein from the reel, while its ends are so clamped, by relative movement of the reel and skein in a direction substantially at right angles to the length of the skein, moving the skein with its ends still clamped in a direction substantially at right angles to the direction of its aforesaid movement into engagement with a wrapper, and completing the application of the wrapper while moving the skein to a delivery position.

8. That method of packaging laces which comprises as steps arranging a lace with a straight run thereof in a substantially horizontal position and with short and long ends depending from said run, seizing said run and moving it in its own vertical plane transversely to carry the short depending end to the opposite side of the long end, coiling the lace to form a skein beginning at said short end, and while coiling it placing the long depending portion under tension.

9. That method of packaging laces which comprises as steps arranging a series of laces each with a straight run and with short and long depending ends, said runs of the laces being parallel and spaced, seizing a pair of said runs and moving them in a direction perpendicular to the runs, thereafter moving said runs in an arcuate path and in their own respective vertical planes to carry the short depending ends to the opposite sides of the long depending ends, coiling the laces simultaneously to form a duplex skein beginning at the short ends of the laces, and while coiling them keeping each of the long depending ends under individual tension.

10. That method of packaging strand-like articles which comprises as steps arranging such an article upon a support so that one end of the article depends at one side of the support and the second end depends from the other side, seizing the article near the second end, lifting it from the support and carrying said second end over to the opposite side of the first end, thereby wholly disengaging the article from the support, and coiling the article beginning at said second end while subjecting the article to yielding pressure to tension it.

11. Apparatus for packaging shoe laces in pairs comprising means for skeining a pair of laces and for wrapping the skein, and means for presenting laces in limitless series wherein laces are spaced a predetermined and definite distance apart for delivery to the skeining means, said presenting means holding each lace of the series with a portion thereof in a substantially horizontal plane.

12. Apparatus for packaging laces having a reservoir for laces, said reservoir comprising an elongate section of definite length, said section being provided with means for supporting a plurality of laces in definite relative position, and means for uniting such sections end to end to form a composite reservoir of any desired length.

13. Apparatus for packaging shoe laces comprising skein-forming and wrapping means, means for feeding laces to the skein-forming means comprising a plurality of reservoir sections, each provided with means for holding a series of uniformly spaced laces, and means for uniting and moving said sections in such a way as to present an unbroken series of laces for delivery to the skeining means.

14. Apparatus for packaging laces having a reservoir for laces, said reservoir comprising elongate sections of definite length, each section having a series of spaced lace receiving slots, and means for uniting said sections end to end to form a composite reservoir of desired length, the end portions of the respective sections being so arranged that when united the series of lace-receiving slots is continuous and uninterrupted at the junction of the sections.

15. Apparatus for packaging laces having a reservoir for laces, said reservoir comprising elongate sections of definite length, each section having an attaching element, a conveyor for moving said sections, and means on the conveyor engageable with said attaching element for removably securing a section to the conveyor.

16. Apparatus for packaging laces having lace presenting means comprising an elongate rigid guideway, an endless chain having one run associated with said guideway, means for moving the chain intermittently step by step, a reservoir section having lace positioning means, said section being slidable along said guideway, and means for releasably attaching said section to the chain.

17. Apparatus for packaging laces having a reservoir for laces, said reservoir comprising elongate sections of definite length, each section having a transverse bar, an endless chain conveyor, and relatively movable gripper jaws carried by said conveyor and engageable with the transverse bar of a section for releasably attaching the latter to the chain.

18. Apparatus for packaging laces having a reservoir for laces, said reservoir comprising elongate sections of definite length, each section having a pin near one end and a hook near the other end, the hook of one section being adapted to engage the pin of an adjacent section whereby to unite said sections to form a composite reservoir.

19. Apparatus of the class described comprising a reservoir for laces arranged to support a plurality of laces with their ends freely depending, and means for longitudinally stroking depending ends of the laces to prevent snarling.

20. Apparatus of the class described comprising a reservoir in which a series of laces is supported with a substantial length of each lace in freely depending position, and means moving downwardly along the depending portions of the laces for smoothing them to prevent snarling.

21. Apparatus of the class described comprising a reservoir in which a series of laces is supported with a substantial length of each lace in freely depending position, and a series of combing elements moving downwardly successively along said depending portions of the laces to smooth them and keep them from snarling.

22. Apparatus of the class described comprising a reservoir in which a series of laces is supported with a substantial length of each lace in freely depending position, and a flexibly supported arm moving downwardly along said depending portions of the laces for keeping them smooth and free from snarling.

23. Apparatus of the class described comprising a reservoir in which a series of laces is supported with a substantial length of each lace in freely depending position, an endless chain disposed substantially in the vertical plane of said depending portions of the laces, a plurality of spaced combing arms each secured at one end to the chain, and means for driving the chain in such a way as to cause said arms successively to move downwardly in contact with the depending ends of the laces.

24. Apparatus of the class described comprising skein-forming means, a reservoir spaced from the skein-forming means, said reservoir holding a lace with a long depending end portion between the reservoir and skein-forming means and a short depending end at the remote side of the reservoir, means for gripping the lace near its short depending end and for so moving the lace as to dispose its short depending end at the opposite side of the long end and in position for engagement by the skein-forming means.

25. Apparatus of the class described comprising a reel, a reservoir for holding laces each with a run in predetermined fixed position substantially at right angles to the reel shaft, and means for wholly freeing the lace from contact with the reservoir and presenting it for engagement with the reel.

26. Apparatus of the class described comprising a reel having means for holding a short depending end of a lace, means adjacent to the reel for supporting the long depending end of the lace during reeling, a reservoir for laces arranged to hold a lace with its long depending end between the reservoir and said supporting means and with the short end of the lace depending at the opposite side of the reservoir, and means for moving the short depending end of the lace transversely across the reservoir and support and into position for engagement with the holding means of the reel.

27. Apparatus of the class described comprising a reel having means for holding one end of a lace, means adjacent to the reel for supporting and tensioning a depending portion of the lace during reeling, a reservoir for laces arranged to hold a lace with its ends depending and with a run of the lace in definite position, and means for gripping said definitely positioned run of the lace and transferring it to a point such that an end of the lace may be engaged by the holding devices of the reel, the parts being so constructed and arranged that the entire lace is permanently freed from contact with the reservoir when said definitely positioned run is removed from the reservoir.

28. A machine of the class described comprising a reel turning upon a horizontal axis, said reel having skein-holding arms, one at least of said arms having lace retaining means, a support for the trailing end portion of a lace during reeling, said support being substantially in the plane of the reel, a reservoir in which laces are held in definite position with a substantial length of the lace freely depending, and means for seizing the lace at a point adjacent to the reservoir and for delivering the lace to the retaining means of the reel while causing said depending portion of the lace to move in the vertical plane of the reel and support and into contact with the latter.

29. Apparatus of the class described comprising a reel having lace-gripping means, a reservoir spaced from the reel and comprising means for positioning a run of a lace substantially at right angles to the reel axis with a long depending end between one end of said run and the reel and a short depending end at the remote end of said run, and means for seizing said run and moving the lace to cause the short depending end to swing through substantially 360° while moving to the other side of the long depending end and into position for engagement by the gripping means of the reel.

30. Apparatus of the class described comprising a reel having means for holding a lace, a reservoir in which a lace is held in definite predetermined position, an arm swinging in a substantially vertical plane, jaws carried by said arm, means for advancing the jaws while open to engage a lace in the reservoir and to close the jaws on said lace, and means for swinging the arm to carry the lace from the reservoir and deliver it to the holding means of the reel.

31. Apparatus of the class described comprising a reel having a pair of skein-holding arms, one at least of said arms having lace-holding means, a reservoir spaced from the reel, said reservoir holding a lace in predetermined position with a depending short end and a depending long end, an arm swinging in a vertical plane, jaws carried by the arm, means for positioning the jaws while open to engage the lace near its short depending end and to close the jaws on the lace, and means for moving the arm and causing it to swing through substantially 180° whereby to remove the lace from the reservoir and dispose its short end in position for engagement by the holding means of the reel arm.

32. Apparatus of the class described comprising a reel having a pair of skein-holding arms, one at least of said arms having lace-holding means, a reservoir spaced from the reel, said reservoir holding a lace in predetermined position with a depending short end and a depending long end, a carriage movable horizontally from a point near the reservoir to a point near the reel, an arm on the carriage pivoted to swing in a vertical plane, a pair of relatively movable jaws carried by the arm, means for advancing said jaws relatively to the arm while open to engage the lace in the reservoir near its short depending end, means to close the jaws on the lace and for retracting them relatively to the arm to withdraw the lace from the reservoir, and means for moving the carriage and swinging the arm to carry the depending short end of the lace in an arcuate path and dispose it in position for engagement by the holding means of the reel arm.

33. Apparatus of the class described comprising a reel, a reservoir arranged to support a lace with a predetermined run thereof disposed substantially at right angles to the reel axis, a carriage movable between the reel and reservoir, an arm mounted on the carriage to swing in a vertical plane, a pair of jaws supported by the arm, means for separating said jaws vertically and advancing them while open to receive the positioned run of a lace between the horizontally disposed faces of the jaws, means for closing the jaws on the lace and for retracting them to pull the positioned run from the reservoir, means for moving the carriage and swinging the arm whereby to carry the jaws through an arc of substantially 180° thereby causing one depending end of the lace to swing to the opposite side of the other depending end and into position for engagement by the reel.

34. Apparatus of the class described comprising a reel, means for moving the reel axially from lace-receiving to reeling position, means for presenting a short end of a lace in position to be engaged with the reel, and means for supporting the longer end portion of the lace, said latter means moving axially with the reel from receiving to reeling position.

35. Apparatus of the class described comprising a reel having lace-holding means, means for presenting a short depending end of a lace to the lace-holding means of the reel, means for tensioning the lace during reeling, means for rotating the reel to form the lace into a skein, means for axially advancing the reel after reeling is complete, and end-retaining means engageable with the skein before and during the axial advance of the reel.

36. Apparatus of the class described comprising a reel, means for moving the reel axially from lace-receiving to reeling position, means for presenting a short end of a lace in position to be engaged with the reel, means for supporting the longer end portion of the lace, said supporting means comprising a table on which the depending portion of the lace rests, tension-applying means for pressing the lace against the table, and means for moving said table concomitantly with the reel as the latter moves from lace receiving to reeling position.

37. Apparatus of the class described comprising a reel, means for presenting a short end of a lace in position to be engaged with the reel, means for supporting the longer end portion of the lace, said supporting means comprising a table of sufficient width to support a pair of laces side by side, and tension means comprising a pair of independent, yieldable shoes engageable respectively with the laces of a pair to press them into contact with the table.

38. Apparatus of the class described comprising a reel, means for moving the reel axially from lace-receiving to reeling position, means for presenting a short end of a lace in position to be engaged with the reel, means for supporting the longer end portion of the lace, said supporting means comprising an inclined table upon which the long end portion of the lace rests, and laterally flared guides for ensuring engagement of the lace with the table.

39. Apparatus of the class described comprising a reel, means for moving the reel axially from lace-receiving to reeling position, means for presenting a short end of a lace in position to be engaged with the reel, means for supporting the longer end portion of the lace, said supporting means comprising a table on which the depending portion of the lace rests, a tension carriage, a yielding tension shoe on the carriage, means for moving the carriage and shoe to press the latter upon a lace resting on the table, and means for moving the table concomitantly with the reel as the latter moves from lace receiving to reeling position.

40. Apparatus of the class described comprising a reel, means for moving the reel axially from lace-receiving to reeling position, means for presenting a short end of a lace in position to be engaged with the reel while the latter is in receiving position, means for supporting the longer end portion of the lace, said supporting means comprising a table for supporting the depending end portion of a lace, means for moving the table concomitantly with the axial movement of the reel, tension means cooperable with the table yieldingly to grip a lace during the reeling operation, said tension means normally being retracted from the table, a carriage for the tension means, said carriage being movable in a path substantially at right angles to the path of movement of the table, and means to advance the carriage and operatively position the tension means as the table reaches reeling position.

41. Apparatus of the class described comprising a reel having lace-holding means, means for delivering a short end of a lace to the lace-holding means of the reel, yielding tension means for gripping the long end of the lace, and tucking means adapted to form a bight in the lace to ensure its engagement by the tension means.

42. Apparatus of the class described comprising a reel having lace-holding means, means for presenting a short depending end of a lace to the lace-holding means of the reel, means for tensioning the lace during reeling, means for rotating the reel to coil the lace, means for advancing the reel axially after reeling is complete, end-retaining means for confining the end of the coiled lace during such axial movement of the reel, and means for suddenly applying such end-retaining means at the completion of reeling and before the reel begins its axial movement.

43. Apparatus of the class described comprising a reel having lace-holding means, means for presenting a short depending end of a lace to the lace-holding means of the reel, means for tensioning the lace during reeling, means for rotating the reel, means for advancing the reel after reeling is complete, an end-retaining member for confining the end of the lace during such axial movement of the reel, spring means tending to move said retaining member to operative position, a latch for holding the retaining member out of action during reeling, cam means for releasing the latch at the end of reeling, and means for restoring the retaining member and latch to initial position.

44. Apparatus of the class described comprising a reel whose axis is always disposed in substantially the same position, said reel having a pair of spaced skein-holding arms, means for holding the reel stationary in lace-receiving position with said arms disposed in a predetermined plane, means for rotating the reel to coil the lace and form a skein, and means for holding the reel stationary with the skein in delivery position and with the reel arms disposed in a plane different from that which they occupy when in receiving position.

45. Apparatus of the class described comprising a reel which rotates about a substantially horizontal axis, said reel being provided with a pair of spaced skein-holding arms, means for holding the reel stationary in lace-receiving position with said arms disposed in a substantially vertical plane for engagement with the depending end of a lace, means for rotating the reel to coil the lace and form a skein, and means for holding the reel stationary in delivery position with its arms in a substantially horizontal plane.

46. Apparatus for pairing laces comprising means for advancing a pair of laces with their ends depending, a reel whose axis is always disposed in substantially the same position, and reel being provided with a pair of spaced, skein-reel being provided with a pair of spaced, skein-holding arms, one at least of said arms having lace-gripping means, means for holding the reel stationary in position for receiving the depending ends of the laces in the gripping means of said reel arm, means to rotate the reel to wind the laces, means to hold the reel stationary with its arms substantially horizontal, and means for removing the coiled laces from the reel while thus positioned.

47. Apparatus of the class described comprising a reel provided with a pair of spaced skein-holding arms, means for holding the reel stationary in lace-receiving position with said arms disposed in a predetermined plane, means for rotating the reel to reel the laces thereon and for stopping it with its arms in the aforesaid predetermined plane, means for thereafter turning the reel a part turn to bring its arms into another plane and for holding it stationary in said latter position, and means for stripping off the skein from the reel arms while the reel is in the latter position.

48. Apparatus of the class described comprising a reel provided with a pair of spaced skein-holding arms, means for holding the reel stationary in lace-receiving position with said arms disposed in a predetermined plane, means for rotating the reel to wind the laces and form a skein and for stopping the reel with its arms in the aforesaid predetermined plane, means for concomitantly turning the reel a part turn while moving it axially from reeling to delivery position and for holding it stationary in delivery position, and means for stripping the skein from the reel arms while the reel is in delivery position.

49. Apparatus of the class described comprising a reel provided with a pair of spaced skein-holding arms, means for holding the reel stationary in lace-receiving position with said arms disposed in a substantially vertically plane, means for engaging the end portions of a pair of laces with one arm at least of the reel while the latter is so positioned, means for rotating the reel to coil the laces thereon and for stopping the reel when the skein is complete, means for concomitantly rotating the reel a quarter turn and for advancing it axially from reeling to a delivery position wherein its arms are in a substantially horizontal plane, and means for stripping the skein from the reel arms while the reel is in said delivery position.

50. Apparatus of the class described comprising a rotary reel, means for moving the reel axially from a lace-receiving position to a reeling position, means for preventing rotation of the reel until the completion of such movement, drive means for rotating the reel, said drive means stopping when the reeling operation is completed, and means for turning the reel a part turn relatively to the then stationary drive means so as to dispose the reel in skein-delivery position.

51. Apparatus of the class described comprising a rotary reel, means for moving the reel axially from a lace-receiving to a lace-reeling position, a fixed arm engaging the reel during such axial movement to prevent rotation thereof, the arm disengaging the reel at the end of such movement, drive means for rotating the reel, said drive means stopping when the reeling is completed, means independent of the drive means for imparting a partial rotation to the reel while the latter is axially advanced from reeling to delivery position, and means engageable with the end portions of the skein for clamping said ends while the reel is being withdrawn from the skein and restored to initial position.

52. Apparatus of the class described comprising a rotating reel, a stripper means associated with the reel, means for rotating the reel to form a skein thereon and for stopping the reel after completion of the skein, control means for axially advancing the reel together with the stripper means to a delivery position, latch means for temporarily locking the stripper means in delivery position, the control means thereupon returning the reel toward its initial position whereby to strip the skein therefrom, and means for releasing the latch means and for restoring the stripping means to initial position.

53. Apparatus of the class described comprising a tubular reel shaft carrying a reel and a drive pinion, a rod extending axially through the tubular reel shaft, a stripper element carried by the rod, an elongate bearing for the tubular shaft, said bearing having a spiral groove, a stud carried by the tubular shaft and adapted at times to enter said groove, means for intermittently rotating the pinion whereby to turn the tubular shaft together with the reel, stripper element, and rod, means for moving the tubular shaft axially in the intervals between successive periods of rotation, thereby engaging the stud with the spiral slot and causing the reel to make a partial turn, means for latching the stripper rod in advanced position while the reel is subsequently retracted, means for releasing such latch, and a spring for restoring the stripper rod to normal position.

54. Apparatus of the class described comprising a reel having means for supporting a skein, means for rotating the reel to form a skein thereon, a fixed plate disposed parallel to the plane of rotation of the reel, means for moving the reel axially after completion of the reeling operation to engage the skein with said fixed plate, and means movable endwise relatively to the reel for stripping a skein from the reel while holding it in contact with said plate.

55. Apparatus of the class described comprising a reel having means for supporting a skein, means for rotating the reel to form a skein thereon, a fixed plate disposed parallel to the plane of rotation of the reel, means for moving the reel axially after completion of the reeling operation to engage the skein with said fixed plate, means for stripping the skein from the reel while holding it in contact with the plate, and means for gripping the end portions of the skein and for moving it bodily parallel to the plate while in contact with the latter.

56. Apparatus of the class described comprising a rotary reel whose axis is substantially horizontal and fixed in space, wrapping means disposed below the horizontal plane of the reel axis, and means for moving a skein downwardly to the wrapping means from the reel while keeping its constituent turns under restraint.

57. Apparatus of the class described comprising a reel turning about a substantially horizontal axis, said reel having skein-holding arms which are disposed in a substantially horizontal plane when the reel is in delivery position, wrapping means below said horizontal plane, and lowerator means for conveying a skein from the reel to the wrapping means while holding the constituent turns of the skein in definite relative position.

58. Apparatus of the class described comprising a reel having spaced arms for supporting a skein, means for holding the reel in delivery position with the arms in a substantially horizontal plane, means for gripping the skein and for holding it while the reel arms are withdrawn from the skein, and means for moving said gripping means in a substantially vertical rectilinear path while still holding the skein.

59. Apparatus of the class described comprising means for forming a skein and delivering the formed skein in a substantially horizontal position, means for moving the skein bodily in a vertical direction while holding its constituent bights under restraint, and wrapping means for receiving the skein and applying a wrapper thereto.

60. Apparatus of the class described comprising a rotary reel whose axis is substantially horizontal and fixed in space, wrapping means disposed at a level different from that of the reel, said wrapping means comprising a skein-receiving recess, means for disposing the reel in delivery position with the skein substantially in the vertical plane of said recess, and means for conveying the skein from the reel to the recess.

61. Apparatus of the class described comprising a rotary reel whose axis is fixed in space, wrapping means disposed below the reel, and lowerator means operative to convey a skein vertically downward from the reel to the wrapping means.

62. Apparatus of the class described comprising reeling means, wrapping means disposed at a lower level than the reeling means, lowerator means for conveying a skein from the reel to the wrapping means, said lowerator means comprising a pair of vertically moving spaced carriages, each lowerator carriage having a pair of jaws, and means for moving the jaws of a pair toward and from each other.

63. Apparatus of the class described comprising reeling means, wrapping means disposed at a lower level than the reeling means, and lowerator means for conveying a skein from the reel to the wrapping means, said lowerator means comprising a pair of vertically moving spaced carriages, each carriage being provided with skein-gripping jaws, and means for opening the jaws to receive and release a skein and for closing the jaws to grip the opposite ends of a skein.

64. Apparatus of the class described comprising a reeling means, wrapping means disposed at a different level than the reeling means, means for conveying a skein from the reel to the wrapping means, said means comprising a pair of vertically moving spaced carriages, each carriage having a pair of relatively movable jaws, means for moving the jaws of a pair toward and from each other, one jaw of each pair having a horizontally movable extension, and means for moving the extensions of the respective pairs toward and from each other.

65. Apparatus of the class described having a reel, conveyor means comprising spaced sets of jaws, means for disposing said jaws while open in receiving position, means for rotating the reel to form a skein and for moving the reel axially when reeling is complete to insert the end portions of the skein between the jaws of the respective sets, means for closing the jaws and for withdrawing the reel from the skein, and means for moving the jaws with the skein clamped between them to carry the skein to a wrapper-engaging position.

66. Apparatus of the class described having a reel turning about a fixed axis, conveyor means comprising a pair of jaws, means for disposing said jaws while open in receiving position, means for rotating the reel to form a skein and for moving the reel axially at the completion of reeling to insert the end portions of the skein between said jaws, means for closing the jaws, and means for withdrawing the reel from the skein to leave the latter clamped between said jaws.

67. Apparatus of the class described comprising a reel turning upon a substantially horizontal axis, wrapping means disposed at a level below that of the reel, said wrapping means comprising a skein-receiving recess, means for disposing the reel in delivery position with the skein substantially in the vertical plane of said recess, lowerator means for conveying the skein from the reel to the recess, said lowerator means comprising jaw elements for engagement with three sides of a skein while conveying the skein from the reel to the recess, and means engaging the fourth side of the skein while it is being so conveyed.

68. Apparatus of the class described comprising a reel turning upon a subtantially horizontal axis, wrapping means disposed at a level different from that of the reel, said wrapping means comprising a skein receiving recess, means for disposing the reel in delivery position with the skein substantially in a plane of said recess, means for conveying the skein from the reel to the recess, said conveyor means comprising jaws for gripping the opposite end portions of a skein while moving it toward the recess, extension members overlying the central part of the skein to ensure its deposit within the recess, means for opening and closing the jaws, and cam means for moving the extensions longitudinally of the skein.

69. Apparatus of the class described comprising a rotary reel whose axis is substantially horizontal and fixed in space, wrapping means disposed at a level below that of the reel, said wrapping means comprising a skein-receiving recess, means for disposing the reel in delivery position with the skein substantially in the vertical plane of said recess, lowerator means for conveying the skein from the reel to the recess, said lowerator means comprising members for gripping the skein and holding it under confinement while moving it downwardly from the reel to the recess, cam means for moving the lowerator up and down, and cam means for relatively moving the jaws toward and from each other.

70. Apparatus of the class described comprising a reel turning upon a substantially horizontal axis, wrapping means disposed at a level below that of the reel, said wrapping means comprising a skein-receiving recess, means for disposing the reel in delivery position with the skein substantially in the vertical plane of said recess, lowerator means for conveying the skein from the reel to the recess, said lowerator means comprising vertically movable carriages disposed at opposite ends of the recess, each carriage having relatively movable jaws, means for opening the jaws and for moving the carriages to position the open jaws for the reception of the respective end portions of a skein carried by the reel when the latter is disposed in delivery position, means for closing the jaws upon the skein and for withdrawing the reel from the skein, and means for moving the carriages downwardly to deposit the skein in the recess.

71. Apparatus of the class described comprising a reel turning upon a substantially horizontal axis, wrapping means disposed at a level below that of the reel, said wrapping means comprising a skein-receiving recess, means for disposing the reel in delivery position with the skein substantially in the vertical plane of said recess, lowerator means for conveying the skein from the reel to the recess, said lowerator means comprising carriages movable in vertical paths at opposite ends respectively of the recess, each carriage having relatively movable jaws, the upper jaw of each pair having a horizontally movable extension, means for moving the carriage to position the open jaws with their extensions fully projected in position to receive between them a skein held by the reel, actuating means for closing the jaws and for retracting the reel from the skein, means for moving the carriages downwardly to deposit the skein in the recess, and means for compressing the skein in the recess and for moving the jaw extensions outwardly from over the central part of the skein, the jaw actuating means then opening the jaws to release the end portions of the skein.

72. Apparatus for skeining and wrapping shoe laces in pairs comprising a single skein-forming means, and means operative to receive successively formed skeins from said single skein-forming means and to hold a plurality of such skeins while performing different wrapping steps with respect to the several skeins so held, said receiving means comprising a plurality of independent sets of wrapper elements, each set including a pair of oppositely movable wrapper folding wipers.

73. Apparatus of the class described comprising a single reel for winding strand-like articles to form skeins, wrapping means comprising a carrier having a plurality of independent sets of wrapper folding elements, each set including a pair of sliding wiper plates, and means for moving said plates relatively to one another in opposite directions, means for moving said carrier intermittently, and transfer means operative to deliver successively skeined articles from the reel to the successive sets respectively of wrapper folding elements.

74. Apparatus of the class described comprising a movable carrier provided with a plurality of sets of packaging elements, each set including a pair of relatively movable wiper plates mounted to slide relatively to the carrier, means including springs for actuating the wiper plates of the several sets whereby at each to perform a different step in a packaging process, a single reel, means for moving the carrier to bring successive sets of packaging elements into skein-receiving position, and transfer means operative to transfer successively reeled skeins from the single reel to successive sets respectively of packaging elements on the carrier.

75. Apparatus of the class described comprising a movable carrier provided with a plurality of cavities each adapted to receive and to hold a skein during the wrapping process, elements moving with said carrier and associated with each individual cavity for folding a wrapper about a skein disposed in the cavity, means for actuating the folding elements of the respective cavities in succession whereby simultaneously at the several cavities to perform different successive steps in a packaging process, and means for introducing skeins into successive cavities.

76. Apparatus of the class described comprising a movable carrier provided with a plurality of cavities each adapted to receive a skein during the wrapper-applying process, means for moving the carriers whereby to present them successively to a wrapper feeding device, means for actuating the feeding device so as to associate a wrapper with each successively presented cavity, a single reel for reeling shoe laces to form skeins, means for depositing the successively reeled skeins in the cavities provided with wrappers, and means moving with the carrier and individual to each cavity operative to fold the wrappers about the skeins, the folding means at the several cavities operating successively to perform different steps in the folding process.

77. Apparatus of the class described comprising a single reel, a rotary drum provided with sets of packaging elements, and means for transferring successively formed skeins from the reel to successive sets of packaging elements on the drum, each such set of elements including a pair of folder plates, springs tending to move said plates to perform the folding operation, and releasable latch means for retaining the plates in retracted position.

78. Apparatus of the class described comprising a single reel mounted to turn about an axis fixed in space, a rotary drum turning about an axis in a plane substantially perpendicular to the axis of the reel, said drum being provided with a series of sets of packaging elements, and means for clamping the end portions of a skein formed on the reel and for transferring it with its ends still clamped to one of the sets of packaging elements on the drum.

79. Apparatus of the class described comprising a rotary reel, a rotary drum carrying packaging elements, and a reciprocating transfer device provided with means for clamping the ends of a skein formed by the reel and for moving the skein with its ends still clamped to a set of packaging elements on the drum.

80. Apparatus of the class described having skein-forming means, wrapping means comprising a drum having a skein-receiving recess in its periphery, wiper plates mounted on the drum at opposite edges respectively of the recess, means independent of said wiper plates for conveying a formed but unwrapped skein to the recess, and means for moving said plates alternately across the recess whereby to wipe the opposite edges of a wrapper over the skein disposed in the recess.

81. Apparatus of the class described having wrapping means comprising a movable support having an elongate skein-receiving recess open at its ends and at its top, means for disposing a lace in the form of an elongate coil and for positioning the coil parallel to the open side of the recess and vertically above the latter, and means wholly independent of the wrapping means for bodily moving the unwrapped coil vertically downwardly toward and into the recess and for pressing the central part of the coil forcibly into the recess.

82. Apparatus of the class described having wrapping means comprising a part having an elongate skein-receiving recess open at its ends and at one side, means for disposing a lace in the form of an elongate coil, means for gripping the end portions of the coil, means for moving the gripping means to transfer the skein toward and into the recess, and means for forcibly pressing the central part of the skein into the recess until it lies wholly below the outer edge of the latter.

83. Apparatus of the class described comprising a rotary wrapping drum having a skein-receiving recess in its periphery, a pair of wiper plates normally disposed in retracted position at opposite sides of the recess respectively, latch means for holding the respective wiper plates in advanced position across the recess, resilient means tending to restore the plates to retracted position, means for moving one plate across the recess until it is latched in advanced position, and means for moving the other plate to advanced position while concomitantly releasing the first plate.

84. Apparatus of the class described comprising a rotary wrapping drum having a skein-receiving recess in its periphery, a pair of curved wiper plates each adapted to slide along the periphery of the drum to a recess covering position, springs tending to hold the respective plates in normal retracted position at opposite sides respectively of the recess, an actuator operable in one position of the drum to move one of said plates across the recess until it is latched in advanced position, and means operable, after the drum has been turned to dispose the recess at another position, for releasing the holding latch of the first plate and concomitantly advancing and latching the other plate.

85. Apparatus of the class described comprising a rotary wrapping drum having a skein-receiving recess in its periphery, means for intermittently turning the drum to dispose the recess successively in article-receiving, wrapper-pasting, package-compressing, and package-delivering positions, a pair of wiper plates carried by the drum and adapted alternately to slide across the recess, both plates being retracted when the recess is in article-receiving position, means for advancing one plate across the recess and for latching it in advanced position as the drum starts to turn to carry the recess from article-receiving position, means for releasing said plate and concomitantly advancing the other plate as the recess passes wrapper-pasting position, and means for retracting the second plate as the recess approaches package delivery position.

86. Apparatus of the class described comprising a rotary wrapping drum having a skein-receiving recess in its periphery, means for turning the drum intermittently whereby successively to dispose the recess in each of a plurality of package-forming positions, a pair of wiper plates carried by the drum and adapted alternately to slide across the recess, both plates being retracted when the recess is in article-receiving position, means for advancing one plate across the recess and latching it in advanced position, means operative as the drum turns to release and retract said first plate and concomitantly to advance and latch the second plate, and means operative, as the drum turns so as to bring the recess to package delivery position, for releasing and retracting the second plate.

87. Apparatus of the class described comprising a rotary wrapping drum having a skein-receiving recess in its periphery, means for intermittently turning the drum to dispose the recess successively in article-receiving, wrapper-pasting, package-compressing, and package delivery positions, means for disposing a wrapper across the recess and for depositing an article in the recess while the latter is in receiving position in such manner as to cause the ends of the wrapper to project outwardly from the edge of the drum, a pair of wiper plates adapted alternately to slide across the recess, both plates being retracted when the recess is in article-receiving position, means operative as the drum turns, to carry the recess from receiving position, to advance that plate which is at the leading edge of the recess so as to cause the plate to cover the recess and thereby fold down one edge of the wrapper onto the article in the recess, means for locking said plate in advanced position, means operative as the drum turns to bend back the outwardly projecting end of the wrapper and for applying adhesive thereto, means operative subsequent to the action of the adhesive-applying means for releasing the first plate and concomitantly advancing the other plate across the recess so as to fold down the adhesively coated end of the wrapper, means for latching the second plate in advanced position, and means operative when the drum has turned to bring the recess to package delivery position for releasing the second plate and for ejecting the package from the recess.

88. Apparatus of the class described having skein reeling means, means for wrapping each individual skein after reeling, said wrapping means comprising a movable carrier having a skein-receiving recess adapted to receive a single skein means for feeding, cutting off and arranging a wrapper across the recess, and transfer means for receiving an unwrapped skein from the reeling means and, while holding it by its ends, transferring the skein to the recess said transfer means comprising means for forcing the central part of the skein into the recess and relatively movable wiper plates mounted upon the carrier, said plates being operative to wipe the opposite ends of the wrapper about the central part of the skein.

89. Apparatus of the class described comprising wrapping means having a movable part provided with a skein-receiving recess, means for disposing a paper wrapper across the recess, means for forming a skein, means for receiving the skein from the forming means and for forcing the skein down upon the wrapper and into the recess, a wiper carried by said movable part for folding one end of the wrapper over onto the skein, means for applying adhesive to the other end of the wrapper, and a second wiper carried by said movable part for folding the adhesively coated end of the wrapper down onto the other end.

90. Apparatus of the class described having skein-forming means, wrapping means comprising a movable element provided with a series of skein-receiving recesses, means for disposing a wrapper across each recess, means for receiving a skein from the forming means and for disposing it within each recess with an end of the wrapper projecting from the recess, means for applying adhesive to said projecting end, and means carried by said element for folding said end down over each skein in the recess and for holding it under confinement until the adhesive has set.

91. Apparatus of the class described including skein-forming means, wrapping means having a movable carrier provided with a skein-receiving recess, means for disposing a paper wrapper across the recess, means for transferring an unwrapped skein from the skeining means and for depositing said skein against the central part of the wrapper and within the recess, a wiper on the carrier movable to fold one end of the wrapper over onto the skein, a relatively fixed smoothing plate, means for moving the carrier to cause the smoothing plate to engage the other end of the wrapper and turn it back to expose its under surface, means for applying adhesive to said surface, and a second wiper on the carrier for folding the adhesively coated end of the wrapper down onto the first folded end.

92. Apparatus of the class described comprising a reel having lace-retaining means, means for automatically presenting laces two at a time to the retaining means of the reel, means for moving the reel from lace-receiving position to reeling position, means for rotating the reel whereby to coil the laces to form an elongate duplex skein, means for tensioning the laces during the reeling, means for holding the reel stationary with the skein disposed substantially horizontal, means for clamping the end portions of the skein, means for stripping the skein from the reel, wrapping means comprising a part having a skein-receiving recess, means for disposing a wrapper across said recess, means for moving the clamping means with the skein to position the central part of the skein upon the wrapper and within the recess, means for releasing the clamping means and for moving the wrapping means toward delivery position, means for binding the wrapper about the central part of the skein while so moving, and means for compressing the wrapped skein.

93. Apparatus of the class described having skein-forming means, wrapping means comprising a movable element provided with a skein-receiving recess, means carried by said movable element for folding the ends of a wrapper over a skein disposed in the recess, means for moving a skein from the forming means and disposing a wrapper and the skein within the recess with an end of the wrapper projecting from the recess, means for applying adhesive to said projecting end, said adhesive-applying means comprising a receptacle for adhesive, a yielding applicator, and means for moving the applicator from adhesive-gathering position into engagement with the projecting end of the wrapper.

94. Apparatus of the class described having skein-forming means, wrapping means comprising a movable element provided with a skein-receiving recess, means carried by the movable element for folding the ends of a wrapper about a skein disposed in the recess, means for disposing a wrapper and a skein within the recess with an end of the wrapper projecting from the recess, means for applying adhesive to said projecting end, said adhesive-applying means comprising a receptacle for fluid adhesive, a part for lifting adhesive from the receptacle, and an applicator movable from engagement with said lifting element into engagement with the projecting end of the wrapper.

95. Apparatus of the class described having skein-forming means, wrapping means comprising an element provided with a skein-receiving recess, means carried by said recessed element for folding the ends of a wrapper about a skein disposed in the recess, means for moving a skein from the forming means and disposing a wrapper and the skein within the recess with an end of the wrapper projecting from the recess, means for applying adhesive to said projecting end, said adhesive-applying means comprising a receptacle for adhesive, and an applicator movable from adhesive-gathering position within the receptacle to a position outside of the receptacle and into engagement with said projecting end of the wrapper.

96. Apparatus for packaging shoe laces having skein-forming means, skein-wrapping means comprising a part having a skein-receiving recess, means for moving a skein from the forming means to said recess and for folding a wrapper about the skein within the recess, means for applying adhesive to the wrapper before the folding is completed, means for ejecting the wrapped skein in the form of a package from the recess, means providing a restricted delivery channel wherein the package may be held under compression, and means for forcing the ejected package into the recess.

97. Apparatus for packaging shoe laces having skein-forming means, skein-wrapping means comprising a part having a skein-receiving recess, means for moving a skein from the forming means to the recess and for folding a wrapper about the skein within the recess, means for applying adhesive to the wrapper before the folding is completed, means for ejecting the wrapped skein as a package from the recess, spaced elements providing a channel having its receiving end disposed adjacent to the path of the ejected packages, said channel being of such dimensions as to hold packages disposed therein under compression, yielding means opposing ejection of the package, and means for forcing the ejected package into the entrance of said channel.

98. Apparatus for packaging shoe laces having skein-forming means, said apparatus comprising a part having a skein-receiving recess, means for moving a skein from the forming means to the recess and for folding a wrapper about the skein within said recess, an ejector member movable outwardly from the recess to eject the wrapped skein as a package therefrom, a yielding member engageable with the outer side of the package as the latter is ejected whereby to keep the package under compression during ejection, means providing a package-receiving channel, and means movable at an angle to the path of ejection of the package for forcing the package into said channel.

99. Apparatus of the class described having skein-forming means, wrapping means comprising a part having a skein-receiving recess, means for moving a skein from the forming means into the recess and for wrapping the skein while in the recess, means for applying adhesive to the wrapper before wrapping is complete, means for ejecting the wrapped skein as a package from the recess, spaced parts providing an elongate channel adapted to receive a plurality of such packages and to hold them under compression, means for heating one of said parts, and means for forcing successively ejected packages into said channel.

100. Apparatus for packaging shoe laces having skein-forming means, skein-wrapping means comprising a part having a skein-receiving recess, means for moving a skein from the forming means into the recess and for wrapping the skein while in the recess, means for applying adhesive to the wrapper before wrapping is complete, means for ejecting the wrapped skein as a package from the recess, spaced elements providing an elongate channel adapted to receive a plurality of such packages and to hold them under compression, and means for forcing successively ejected packages into said channel.

101. Apparatus of the class described having skein-forming means, package-forming means comprising a rotary drum having a recess in its periphery, means for moving a skein from the forming means and depositing it with a wrapper in said recess, means for applying adhesive to the wrapper and for folding the wrapper over the skein and holding the wrapped skein under confinement as the drum turns to carry the recess to a delivery position, means for ejecting the wrapped skein as a package, spaced parts providing a channel having an arcuate-receiving portion and a substantially straight delivery portion, and a pivoted pusher associated with the curved part of the channel for engaging successively ejected packages and forcing them into the curved end portion of the channel.

ALBERT G. PIECZENTKOWSKI.